US007748813B2

(12) United States Patent
Ito et al.

(10) Patent No.: US 7,748,813 B2
(45) Date of Patent: Jul. 6, 2010

(54) PRINT APPARATUS, PRINT METHOD AND RECORDING MEDIUM DRIVING APPARATUS

(75) Inventors: Tatsumi Ito, Tokyo (JP); Makoto Ando, Tokyo (JP); Koji Ashizaki, Tokyo (JP); Takahiro Toyoda, Tokyo (JP); Minoru Takeda, Tokyo (JP)

(73) Assignee: Sony Corporation, Tokyo (JP)

( * ) Notice: Subject to any disclaimer, the term of this patent is extended or adjusted under 35 U.S.C. 154(b) by 383 days.

(21) Appl. No.: 11/879,841

(22) Filed: Jul. 19, 2007

(65) Prior Publication Data

US 2008/0018689 A1 Jan. 24, 2008

(30) Foreign Application Priority Data

Jul. 21, 2006 (JP) ............................ 2006-199940
Dec. 1, 2006 (JP) ............................ 2006-326260

(51) Int. Cl.
*B41J 29/38* (2006.01)
*B41J 23/00* (2006.01)
*H04N 1/405* (2006.01)

(52) U.S. Cl. ............................ 347/14; 347/37; 358/3.1; 358/3.2

(58) Field of Classification Search .................. 347/14, 347/37, 38, 2, 5, 43, 8, 19; 358/3.06, 3.1, 358/3.09, 3.2, 3.3
See application file for complete search history.

(56) References Cited

U.S. PATENT DOCUMENTS 6,270,176 B1 * 8/2001 Kahle ............................ 347/2
6,530,638 B2 * 3/2003 Shibata et al. ................ 347/15
7,085,017 B1 * 8/2006 Jones et al. .................. 358/3.2
7,484,820 B2 * 2/2009 Sugahara ....................... 347/8
7,484,824 B2 * 2/2009 Chiwata ....................... 347/19
2006/0109308 A1 * 5/2006 Miyamoto .................. 347/43
2008/0018680 A1 1/2008 Ito et al.
2008/0068408 A1 * 3/2008 Matsui et al. .................. 347/8
2008/0238960 A1 10/2008 Ito et al.

FOREIGN PATENT DOCUMENTS

JP 09-265760 10/1997
JP 2002-251862 A 6/2002
JP 2004-110994 A 4/2004
JP 2004-114357 A 4/2004
JP 2005-205636 A 8/2005
JP 2006-231701 A 9/2006
JP 2006-318539 A 11/2006

* cited by examiner

*Primary Examiner*—Stephen D Meier
*Assistant Examiner*—Rene Garcia, Jr.
(74) *Attorney, Agent, or Firm*—Wolf, Greenfield & Sacks, P.C.

(57) ABSTRACT

Disclosed is a print apparatus including a rotating unit rotating a printed object, a print head printing visible information by ejecting ink droplets onto the printed object being rotated by the rotating unit, and a control unit generating ink ejection data based on the visible information and controlling the print head based on the ink ejection data. In the print apparatus, the control unit converts the visible information, which is expressed using biaxial perpendicular coordinate data, to polar coordinate data and carries out dot density correction that applies a correction weighting calculated in accordance with the number of dots per unit area for each dot in the polar coordinate data to a luminance value of each dot to generate the ink ejection data.

10 Claims, 20 Drawing Sheets

$$W(d_i) = r_i / r_N$$

Error Diffusion Ratios
Calculation Point
7/16
3/16
5/16
1/16
Threshold:128

Density Correction of Inner/
Outer Peripheries
$W_{i+1}$=0.5
$W_i$=1.0
Error Diffusion
θ
r
$r_{i+1}$
$r_i$
G1 G2 G3 G4 G5 G6
255 255 255 255
255 — 255 —
H1 H2 H3 H4 H5 H6
127 127 127 127
255 — 255 —
Q1 Q2 Q3 Q4 Q5 Q6
0 255 0 255
255 — 255 —

Error Diffusion Ratios
Threshold:128

Calculation Point
7/16
8/16
1/16

Calculation Point
7/16
3/16
6/16

H1 H2 H3 H4 H5 H6
127 127 127 127
255 255

Q1 Ha2 Ha3 Ha4 Ha5 Ha6
0 182 127 127
318 262

Q1 Q2 Hb3 Hb4 Hb5 Hb6
0 255 95 127
304 234

Q1 Q2 Q3 Hc4
0 255 0 168
304 281

Q1 Q2 Q3 Q4 Hd5
0 255 0 255
304 264

Q1 Q2 Q3 Q4 Q5 He6
0 255 0 255
255 285

Q1 Q2 Q3 Q4 Q5 Q6
0 255 0 255
255 255

PRINT APPARATUS, PRINT METHOD AND RECORDING MEDIUM DRIVING APPARATUS

CROSS REFERENCES TO RELATED APPLICATIONS

The present invention contains subject matter related to Japanese Patent Application JP 2006-199940 filed in the Japanese Patent Office on Jul. 21, 2006 and Japanese Patent Application JP 2006-326260 filed in the Japanese Patent Office on Dec. 1, 2006 the entire contents of which being incorporated herein by reference.

BACKGROUND OF THE INVENTION

1. Field of the Invention

The present invention relates to a print apparatus and a print method that rotate a disc-like recording medium, such as a CD-R (Compact Disc-Recordable) or a DVD-RW (Digital Versatile Disc-Rewritable), a semiconductor storage medium, or other printed object and print visible information such as characters and designs by ejecting ink droplets onto a label surface or other print surface of the rotating printed object, and also relates to a recording medium driving apparatus that rotates a recording medium as one example of a printed object.

2. Description of the Related Art

One example of this type of print apparatus is disclosed by Japanese Unexamined Patent Application Publication No. H09-265760. Japanese Unexamined Patent Application Publication No. H09-265760 relates to an optical disc apparatus that is capable of printing on a removable optical disc. The optical disc apparatus disclosed in Japanese Unexamined Patent Application Publication No. H09-265760 is characterized by being an information storage apparatus that can carry out at least one of the recording and the reproduction of information using a removable optical disc and includes: a print head that prints on the optical disc; a print head driver that moves the print head in the radial direction of the optical disc; a spindle motor that rotates the optical disc; and a control unit that controls the print head, the print head driver, and the spindle motor, where the control unit causes the print head to scan across the optical disc to print on the optical disc.

The optical disc apparatus including disclosed in Japanese Unexamined Patent Application Publication No. H09-265760 demonstrates such an effect of printing a label on an optical disc without having to separately provide a dedicated label printer and with the disc still inserted in the optical disc apparatus (see Paragraph [0059]).

Another example of this type of print apparatus is disclosed by Japanese Unexamined Patent Application Publication No. 2004-110994. Japanese Unexamined Patent Application Publication No. 2004-110994 relates to an optical disc information recorder with ink jet printing apparatus. The optical disc information recorder with ink jet printing apparatus disclosed by Japanese Unexamined Patent Application Publication No. 2004-110994 is characterized by including: a head capable of reproducing and recording information that can be optically read on a recordable optical disc; and an ink jet print head that can print characters, designs, and the like on the label surface of the optical disc, where the characters, designs, and the like are printed on the label surface simultaneously with the recording of optical information on the optical disc.

The optical disc information recorder with ink jet printing apparatus disclosed by Japanese Unexamined Patent Application Publication No. 2004-110994 with the construction described above demonstrates such an effect of being able to record optical information on a recordable optical disc and simultaneously print on the label surface, which may not only greatly reduce the time required compared to when both processes are carried out separately in the related art apparatuses but may also use a compact construction where separate apparatuses do not need to be provided (see Paragraph [0050]).

However, both the optical disc apparatus disclosed by Japanese Unexamined Patent Application Publication No. H09-265760 and the optical disc information recorder with ink jet printing apparatus disclosed by Japanese Unexamined Patent Application Publication No. 2004-110994 are constructed so as to print visible information on the label surface of an optical disc by ejecting ink droplets onto the optical disc as it rotates from ejection nozzles provided on a print head. In apparatuses employing such construction, when the printing is carried out with the optical disc rotating at a constant angular velocity and with the ink droplets being ejected by the print head at a constant timing, there will be a difference in print density between the inner and outer peripheries of the print region.

FIG. 1A shows a state where ink droplets 103 ejected from a print head 102 have dripped onto a label surface 101*a* of the optical disc 101 such as a CD-R as one specific example of a printed object. As shown in FIG. 1A, in this example, the print head 102 includes sixteen ejection nozzles aligned in the radial direction of the optical disc 101, and when the ink droplets 103 are ejected from the ejection nozzles, a total of sixteen ink droplets 103 are dripped onto the label surface 101*a*. FIG. 1B shows a printed object that has been printed with the print head 102 ejecting the ink droplets 103 at a constant timing and with the optical disc 101 rotating at a constant angular velocity.

As shown in FIG. 1B, when printing is carried out with a constant angular velocity of the optical disc 101 and with the ink droplets 103 being ejected at a constant timing, the intervals between ink droplets 103 that are adjacent in the direction of rotation of the optical disc 101 (hereinafter "ink droplet intervals") will differ between the inner and outer peripheries of the print region. That is, since the ink droplet intervals are proportionate to the distance (i.e., "radius") from the center of rotation O of the optical disc 101, the ink droplet intervals in the inner periphery of the print region are narrower than the ink droplet intervals in the outer periphery. This implies that the amount of ink per unit area is greater in the inner periphery of the print region than in the outer periphery (i.e., the print density is higher), resulting in a difference in print density between the inner and outer peripheries of the print region.

To counteract such difference in print density between the inner and outer peripheries of the print region, Japanese Unexamined Patent Application Publication No. H09-265760 discloses one example that carries out control to make the rotational velocity of the optical disc relative to the print head, that is, the linear velocity, constant. Such control to make the linear velocity constant is effective when the print head is equipped with a single ejection nozzle. However, a plurality of ejection nozzles are provided on a typical print head so as to be aligned in the radial direction of the optical disc (or print region). Since the ink droplet interval differs according to the distance (i.e., "radius") from the center of rotation of the optical disc to the respective ejection nozzles, there is the risk of a difference being produced in the print density.

SUMMARY OF THE INVENTION

According to embodiments of the present invention attempts have been made in counteract differences occurred in the print density between the inner and outer peripheries of the print region when the angular velocity of a printed object and the timing for ejecting ink droplets are both constant for a print apparatus that prints visible information on a print surface of the printed object by ejecting ink droplets from ejection nozzles provided on a print head onto the printed object that is rotated. The embodiments have also attempted to counteract differences in print density occurred when a print head equipped with a plurality of ejection nozzles is used due to the differences in the radial distances from the center of rotation to the respective ejection nozzles even when control is carried out to make the linear velocity of the rotating printed object constant.

A print apparatus according to an embodiment of the present invention includes: a rotating unit that rotates a printed object; a print head that prints visible information by ejecting ink droplets onto the printed object being rotated by the rotating unit; and a control unit that generates ink ejection data based on the visible information and controls the print head based on the ink ejection data. The control unit converts the visible information, which is expressed using biaxial perpendicular coordinate data, to polar coordinate data and carries out dot density correction that applies a correction weighting calculated in accordance with the number of dots per unit area for each dot in the polar coordinate data to a luminance value of each dot to generate the ink ejection data.

According to an embodiment of the present invention, a method of printing visible information by ejecting ink droplets from a print head onto a printed object rotated by a rotating unit, the method including steps of: converting the visible information from biaxial perpendicular coordinate data to polar coordinate data; calculating dot correction data by carrying out a dot density correction that applies a correction weighting calculated according to a number of dots per unit area centered on each dot in the polar coordinate data to a luminance value of each dot; generating ink ejection data by binarizing the dot correction data according to an error diffusion method; and printing the visible information by ejecting ink droplets onto the printed object based on the ink ejection data.

A recording medium driving apparatus according to an embodiment of the present invention includes: a reading unit that reads information from a recording surface of a recording medium; a rotating unit that rotates the recording medium; a print head that prints visible information by ejecting ink droplets on a label surface of the recording medium being rotated by the rotating unit; and a control unit that generates ink ejection data based on the visible information and controls the print head based on the ink ejection data and position data for the recording medium obtained from the information read by the reading unit. The control unit converts the visible information which is expressed using biaxial perpendicular coordinate data to polar coordinate data and carries out dot density correction that applies a correction weighting calculated in accordance with the number of dots per unit area for each dot in the polar coordinate data to a luminance value of each dot to generate the ink ejection data.

According to the print apparatus, the print method, and the recording medium driving apparatus of embodiments of the present invention, it is possible to reduce the number of ink droplets ejected as the distance from the inner periphery of the print surface of the printed object falls, and therefore it is possible to print visible information with a substantially uniform print density.

DESCRIPTION OF THE PREFERRED EMBODIMENTS

According to embodiments of the present invention, a print apparatus, a print method, and a recording medium driving apparatus that can print visible information with a substantially uniform print density are realized with a simple construction by generating ink ejection data by carrying out a dot correction that applies a dot correction weighting to visible information converted to polar coordinate data.

Figure 1A:
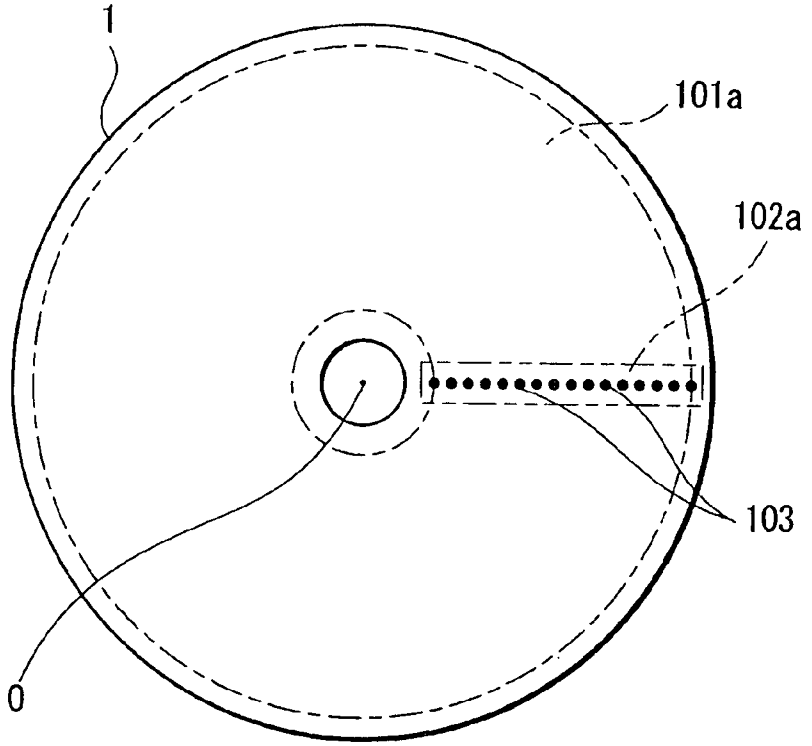
FIGS. 1A and 1B are diagrams useful in explaining printing with a constant angular velocity for the printed object and constant timing for the ejection of ink droplets, with FIG. 1A showing a desired state and FIG. 1B showing the state when printing is complete.
Figure 1B:
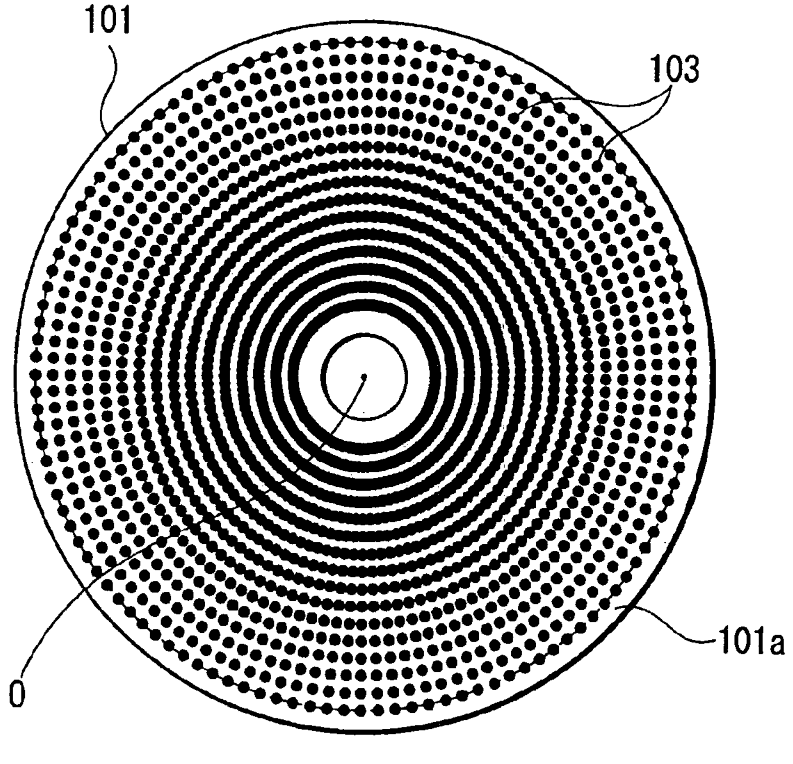
Figure 2:
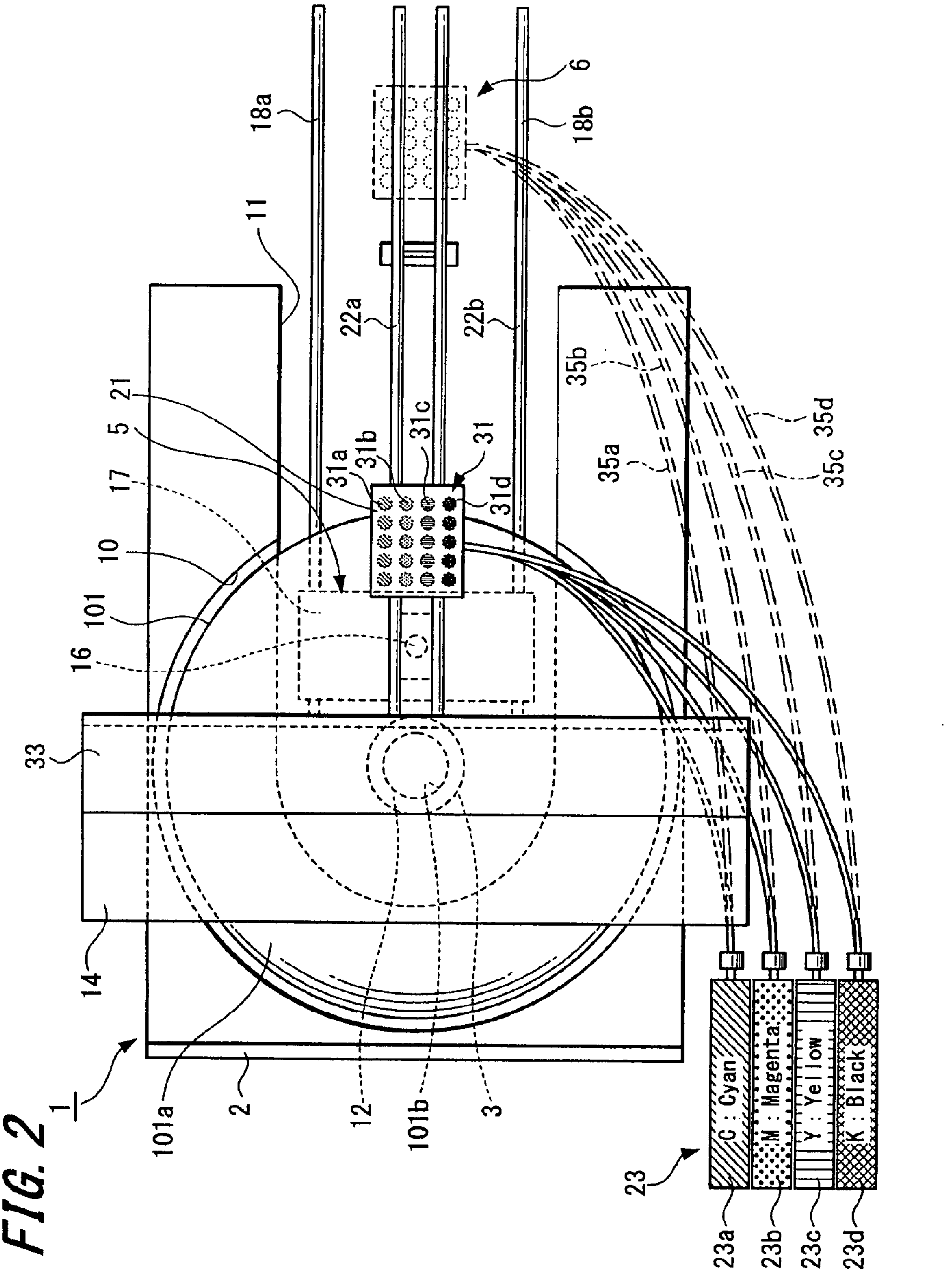
FIG. 2 is a plan view of an optical disc apparatus that is a first embodiment of a print apparatus according to the present invention.
Figure 3:
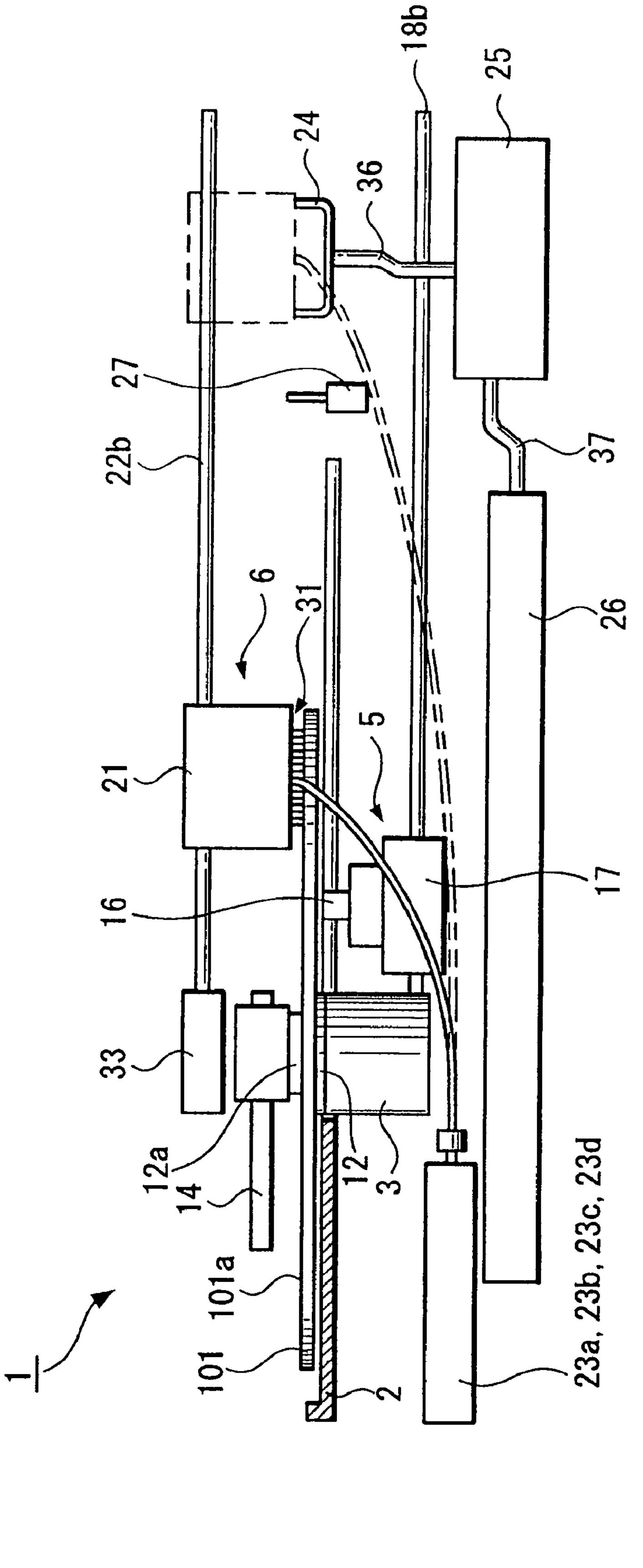
FIG. 3 is a front view of the optical disc apparatus that is the first embodiment of a print apparatus according to the present invention.
Figure 4:
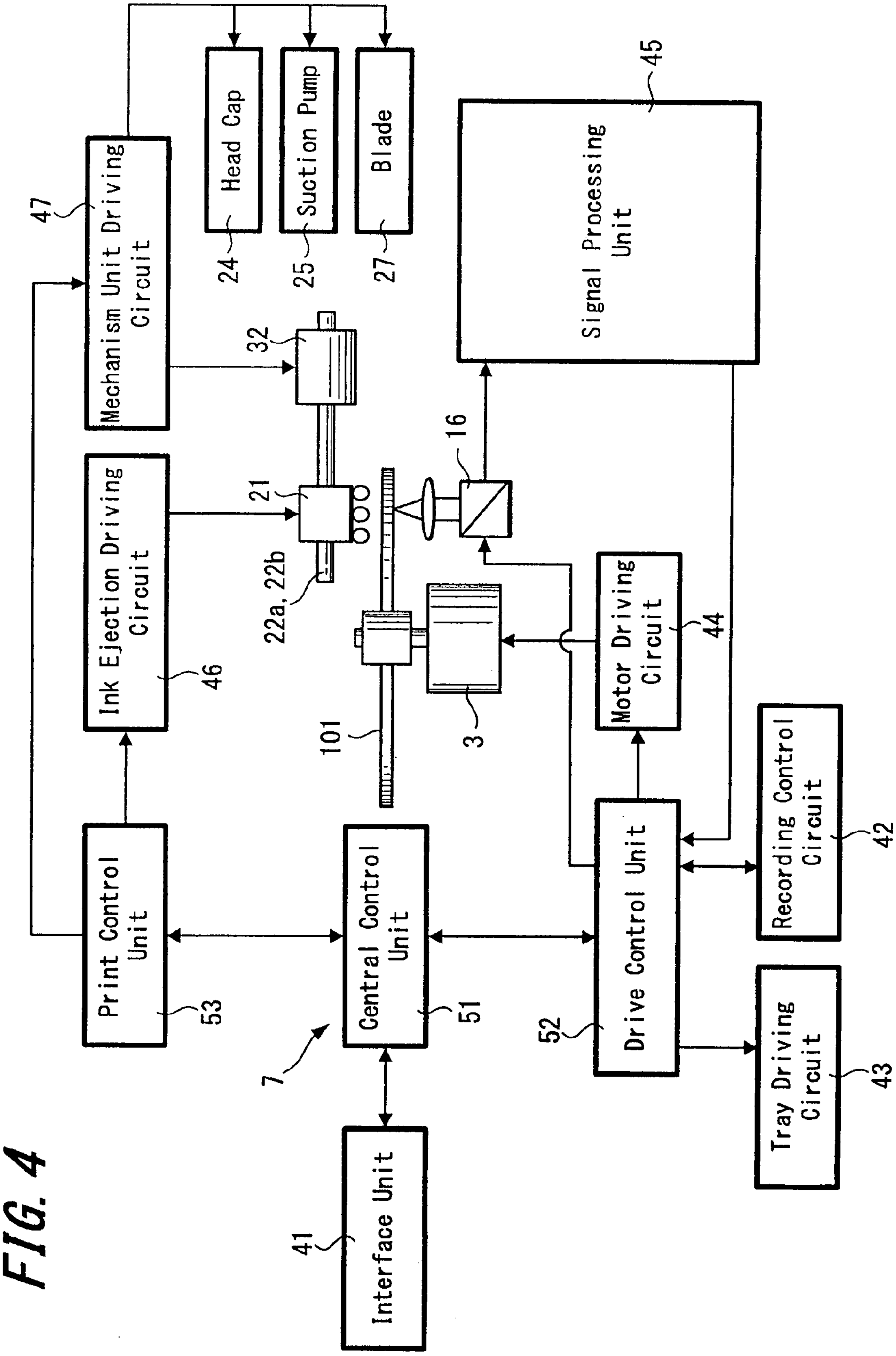
FIG. 4 is a block diagram showing the flow of signals in the optical disc apparatus that is the first embodiment of a print apparatus according to the present invention.
Figure 5:
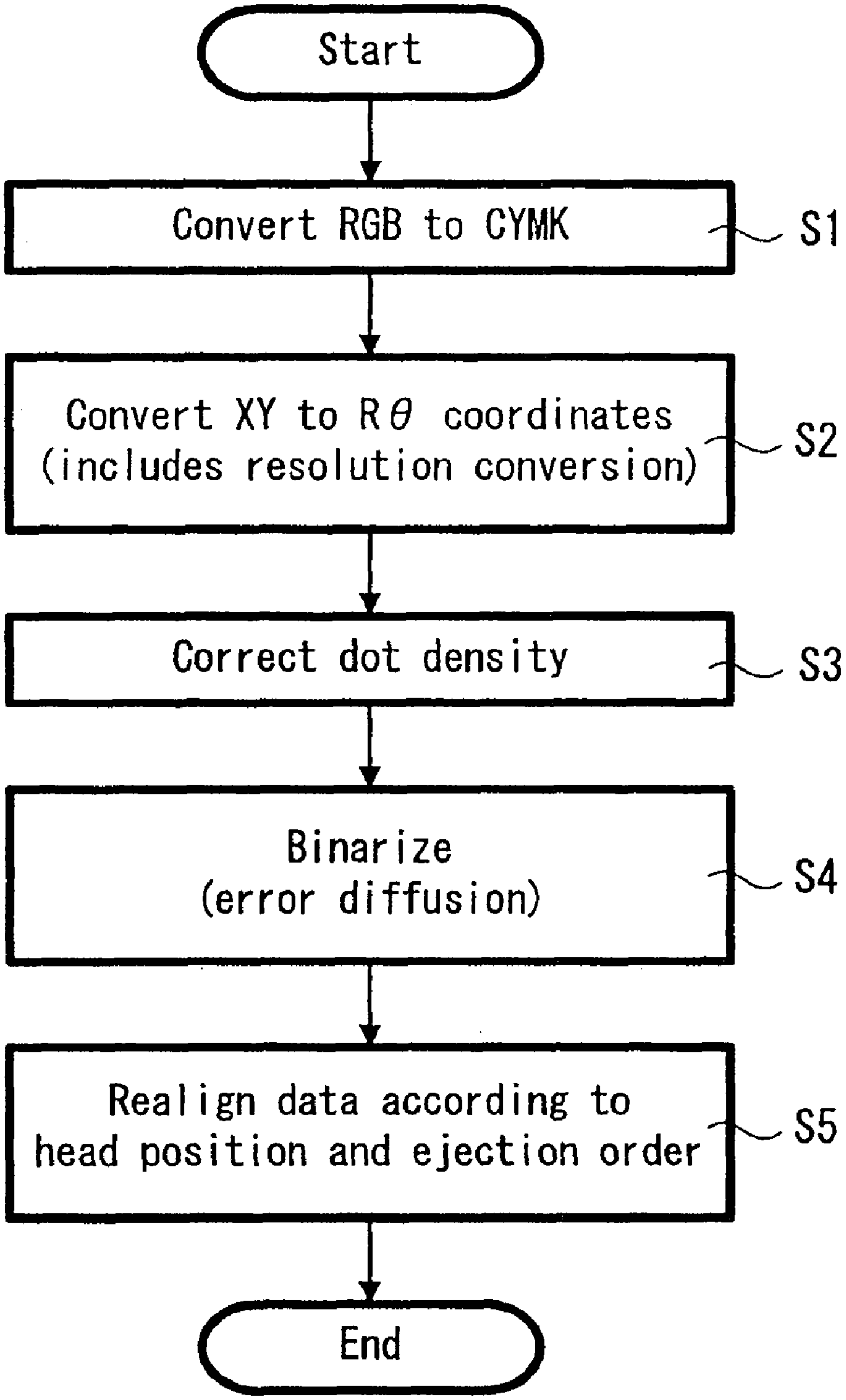
FIG. 5 is a flowchart showing the flow of operations by a control unit of the print apparatus according to the first embodiment of the present invention and is useful in explaining a process that generates ink ejection data based on visible information.
Figures 6A, 6B, 6C:
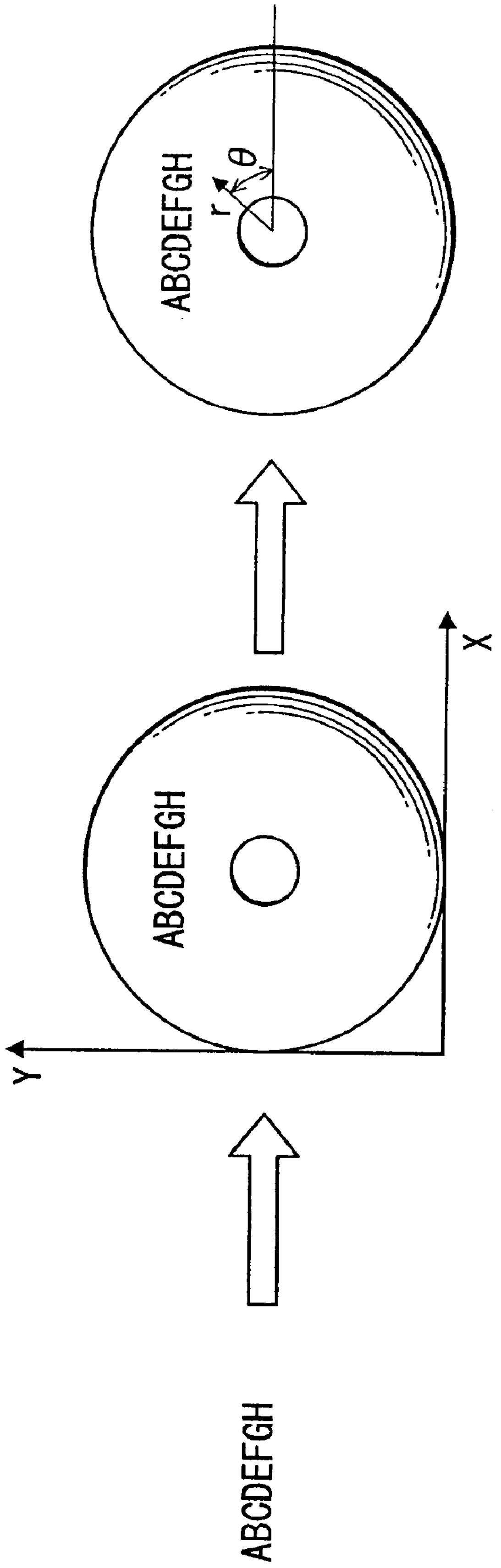
FIGS. 6A to 6C are diagrams useful in explaining a process whereby the print apparatus according to the present invention converts biaxial perpendicular coordinate data to polar coordinate data.
Figure 7:
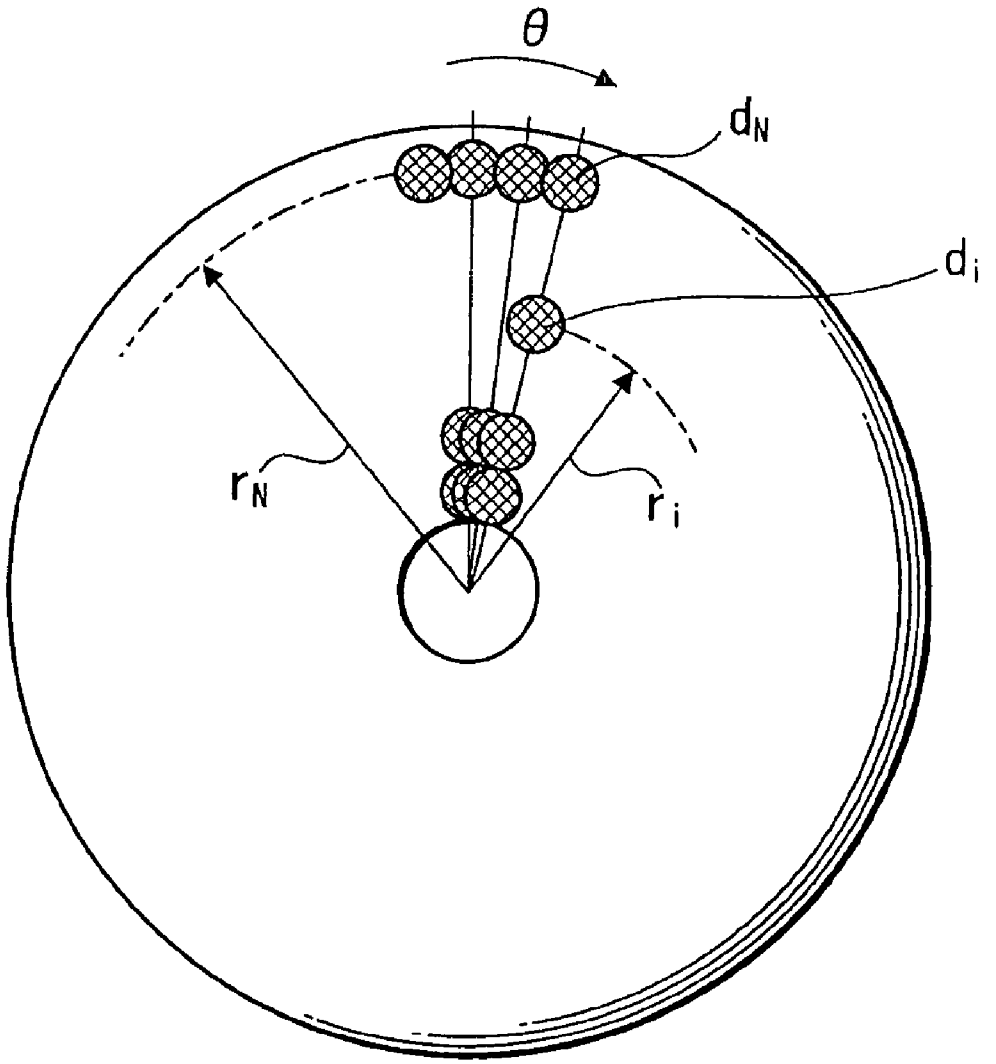
FIG. 7 is a diagram useful in explaining an approximate calculation of correction weightings by the print apparatus according to the present invention.

FIGS. 2 to 9 are explanatory diagrams according to a first embodiment of the present invention. FIG. 2 is a plan view showing a first embodiment of a print apparatus according to the present invention, FIG. 3 is a front view of the same, FIG. 4 is a block diagram showing the flow of signals in the print apparatus shown in FIG. 2, FIG. 5 is a flowchart showing the flow of operations by a control unit, FIGS. 6A to 6C are diagrams useful in explaining a process that converts perpendicular biaxial coordinate data to polar coordinate data, FIG. 7 is a diagram useful in explaining correction weightings for dot density correction, FIGS. 8A to 8F are diagrams useful in explaining the process as far as generation of the ink ejection data, and FIGS. 9A to 9J are diagrams useful in explaining the calculation process of an error diffusion method.

Figure 10B:
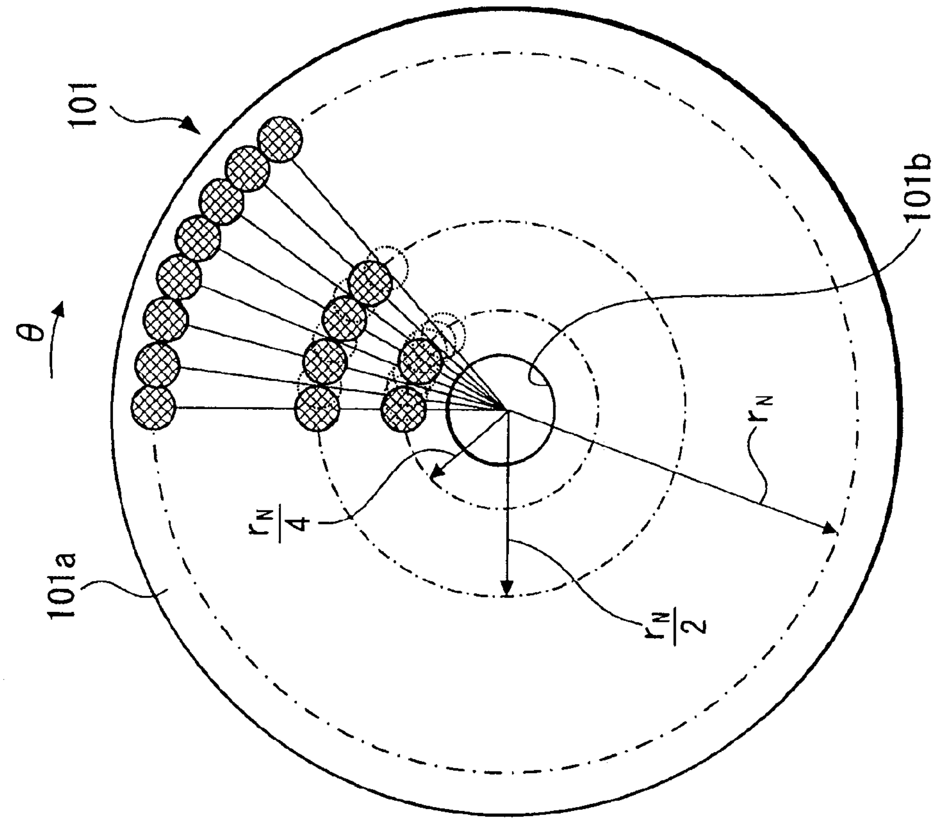
FIGS. 10A and 10B are diagrams useful in explaining a second embodiment of a print apparatus according to the present invention and show how dots are thinned in the polar coordinate data.
Figure 10A:
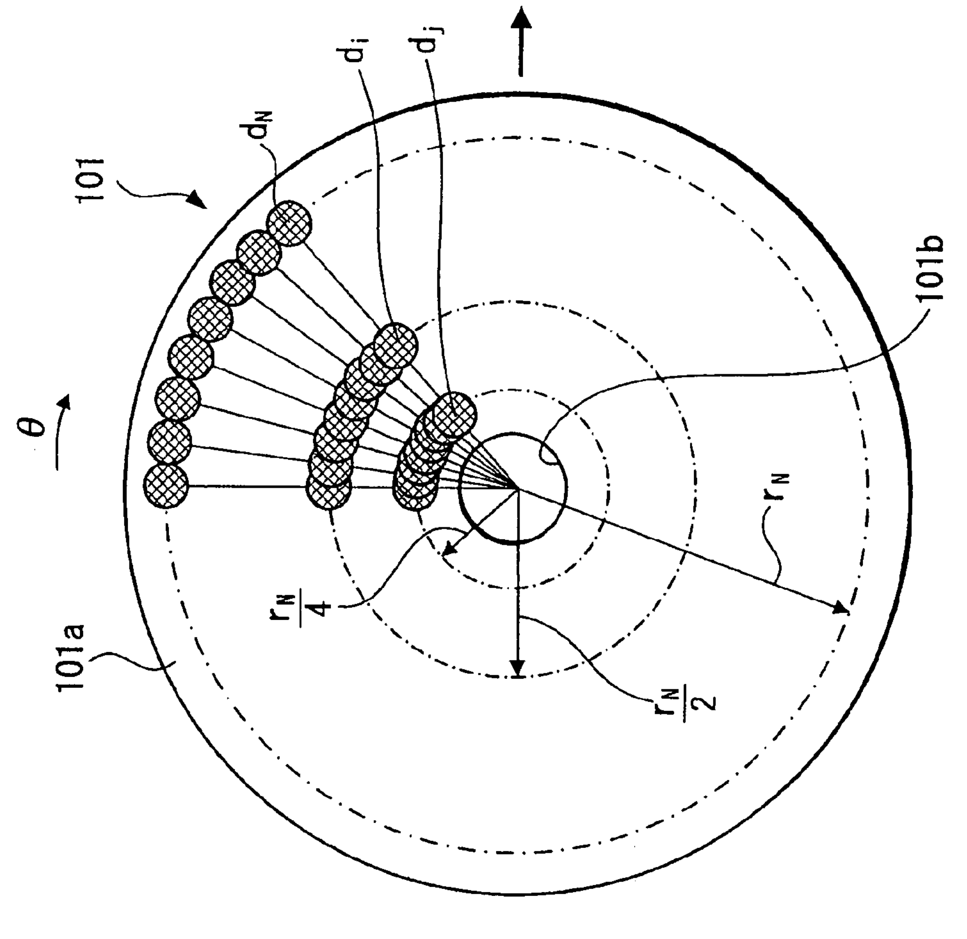
Figure 11:
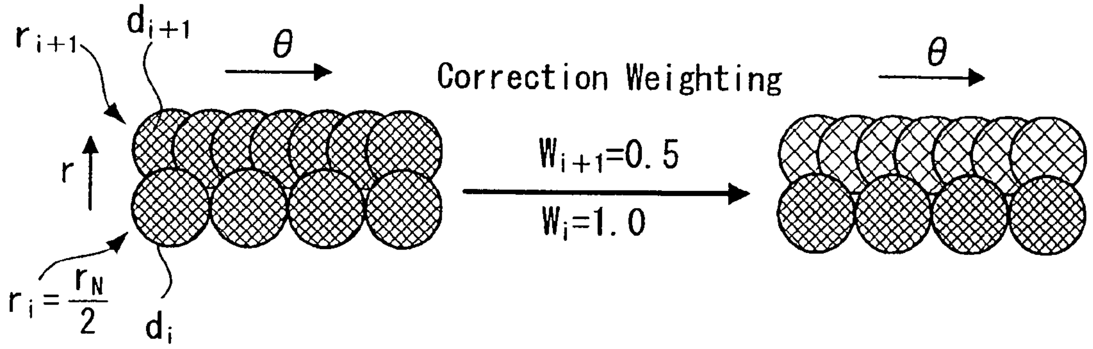
FIG. 11 is a diagram useful in explaining correction weightings used by the second embodiment of a print apparatus according to the present invention.
Figure 12:
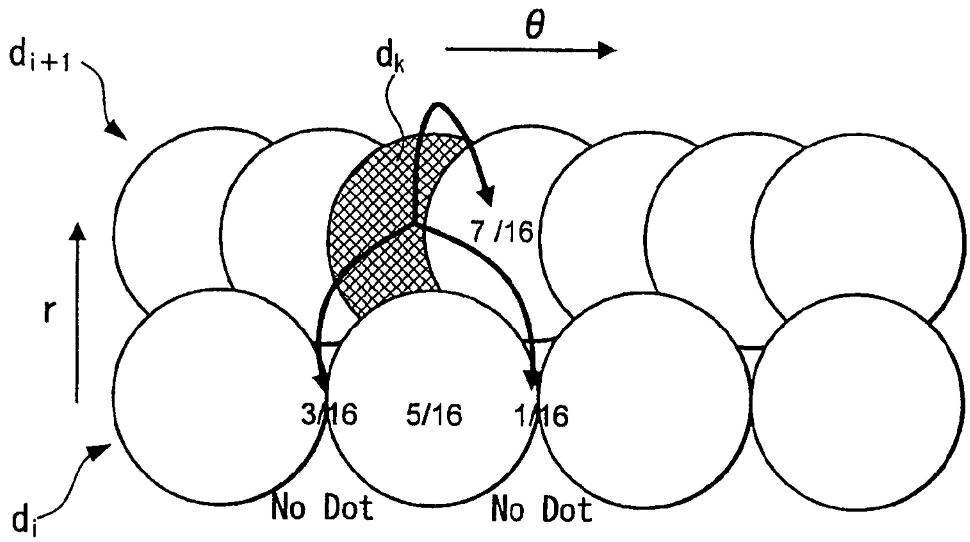
FIG. 12 is a first diagram useful in explaining an error diffusion method used by the second embodiment of a print apparatus according to the present invention.

FIGS. 10 to 15 show a second embodiment of a print apparatus according to the present invention. FIGS. 10A and 10B are diagrams useful in explaining the thinning of dots in the polar coordinate data, FIG. 11 is a diagram useful in explaining correction weightings, FIGS. 12, 13A, and 13B are diagrams useful in explaining an error diffusion method, FIGS. 14A to 14C are diagrams useful in explaining the process as far as the generation of ink ejection data, and FIGS. 15A to 15I are diagrams useful in explaining a calculation process of the error diffusion method.

Figure 16:
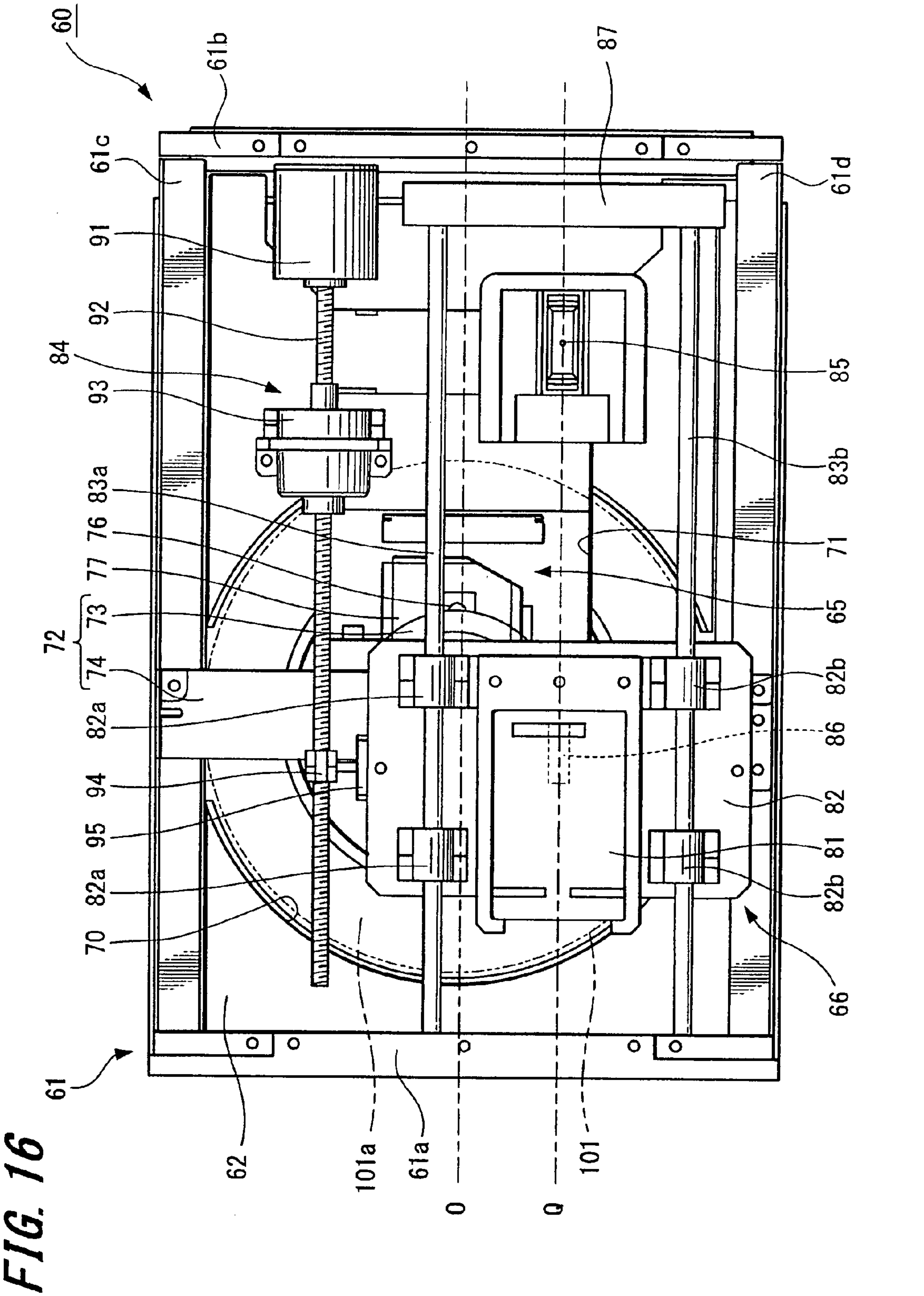
FIG. 16 is a plan view of an optical disc apparatus that is a third embodiment of a print apparatus according to the present invention.
Figure 17:
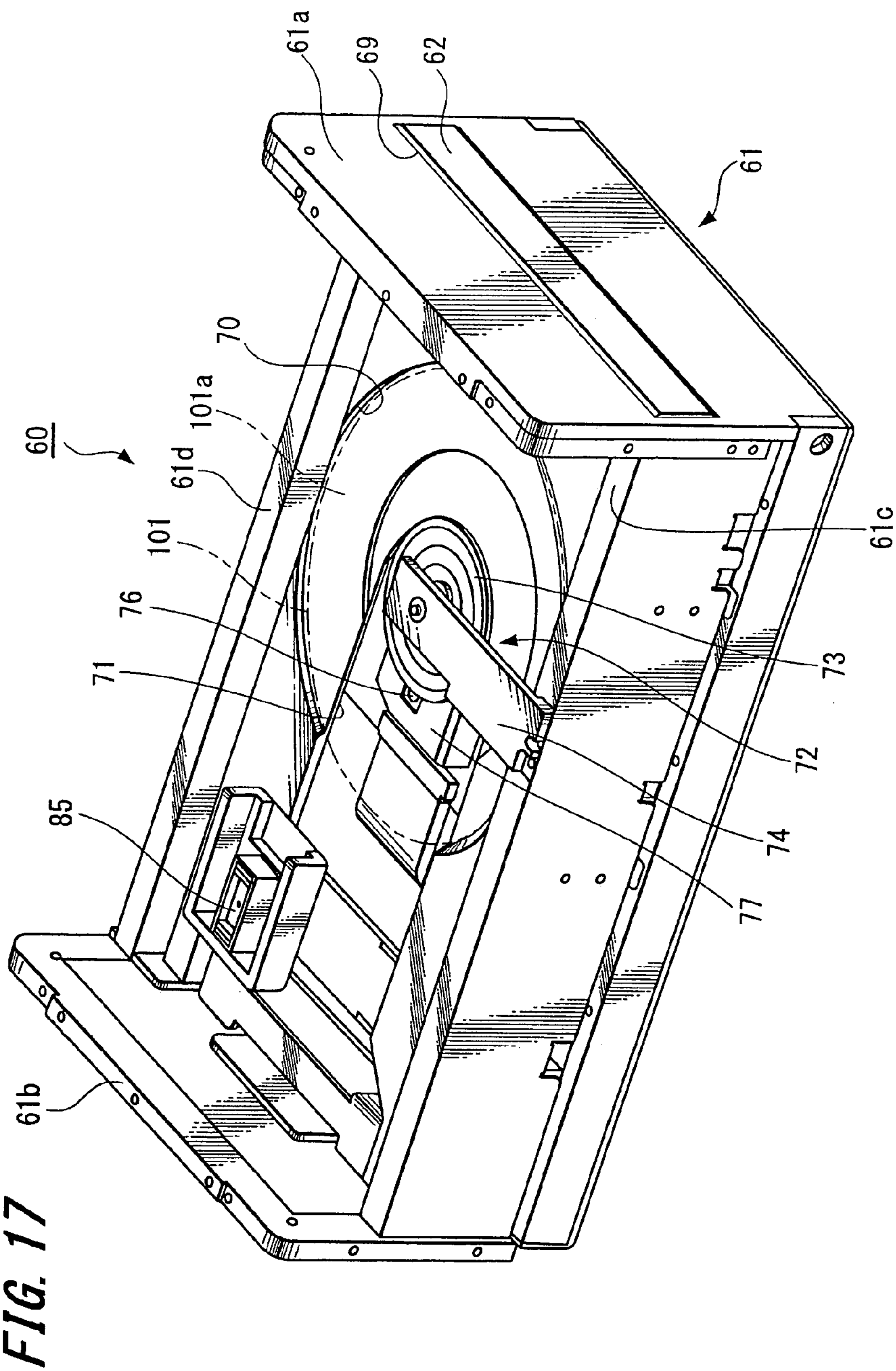
FIG. 17 is a perspective view of the optical disc apparatus that is the third embodiment of a print apparatus according to the present invention.
Figure 18:
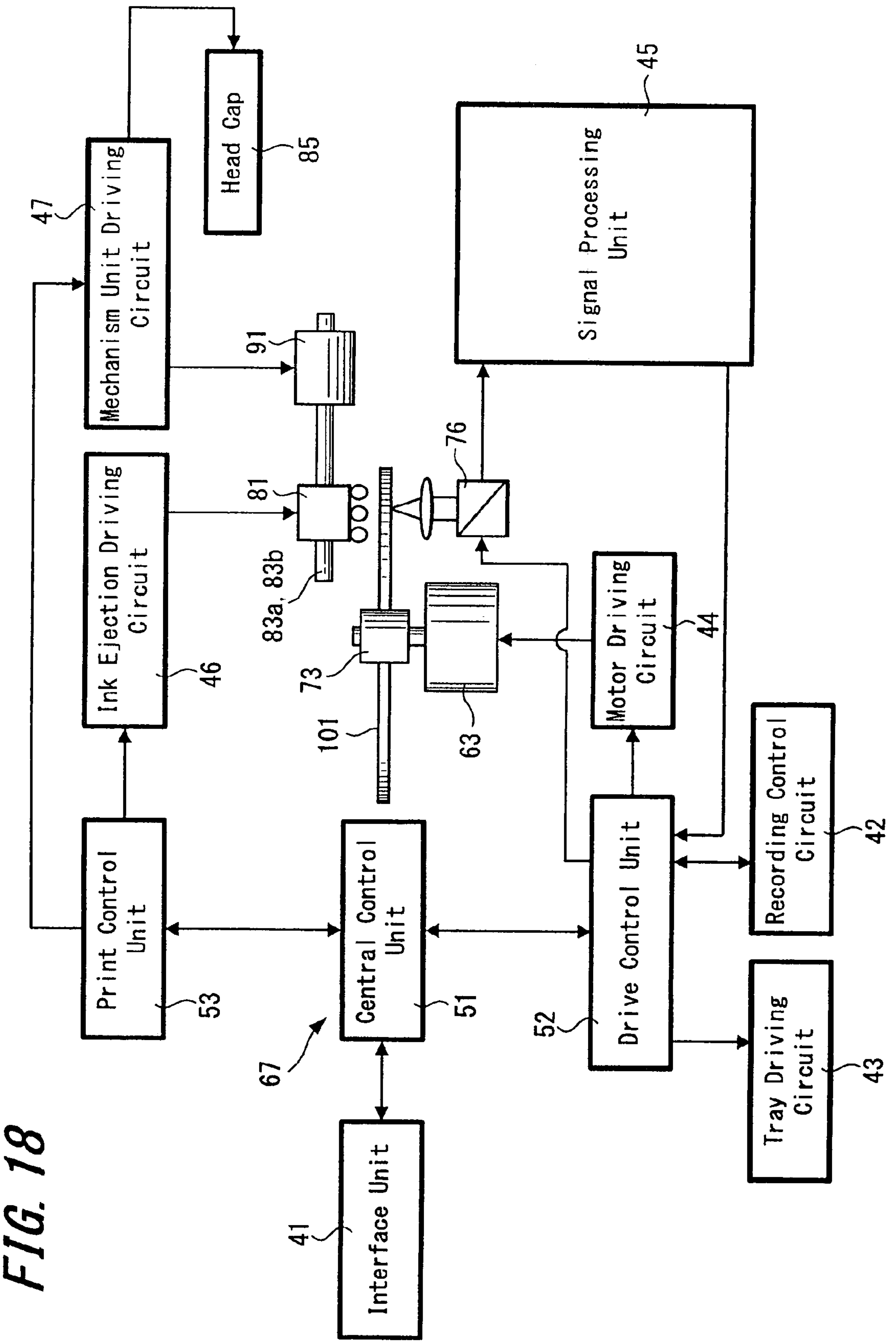
FIG. 18 is a block diagram showing the flow of signals in the optical disc apparatus that is the third embodiment of a print apparatus according to the present invention.
Figure 19:
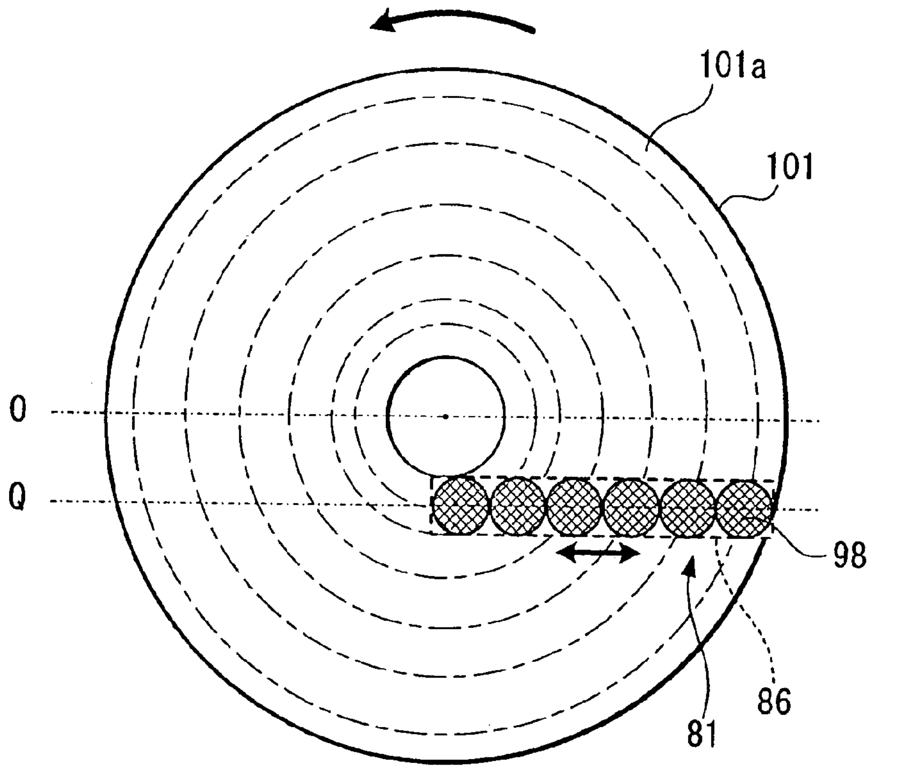
FIG. 19 is a schematic diagram useful in explaining the optical disc apparatus that is a third embodiment of the print apparatus according to the present invention.
Figure 20:
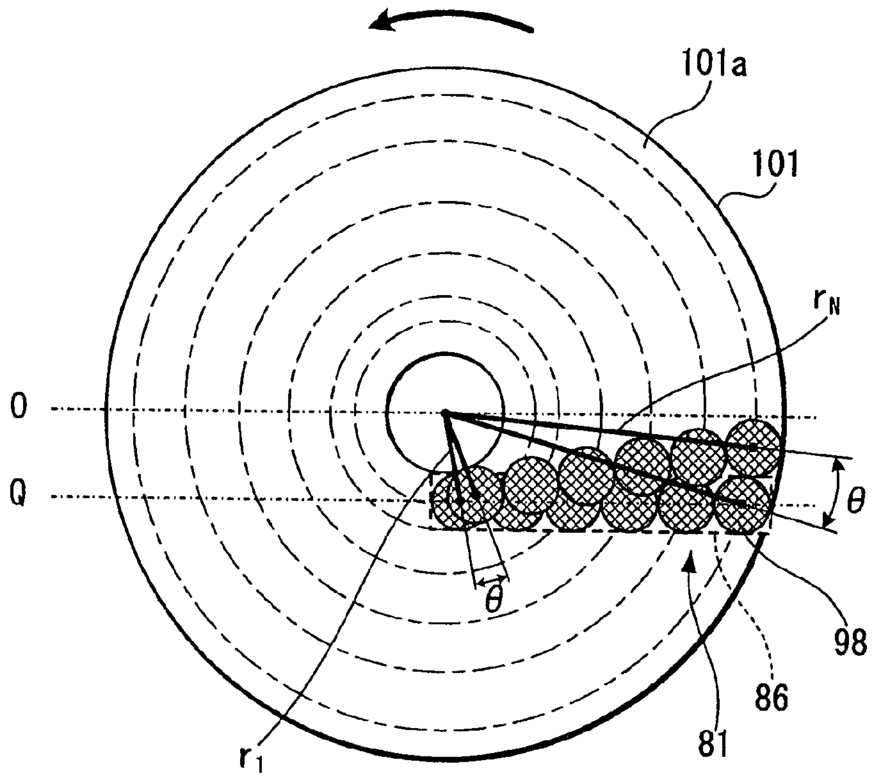
FIG. 20 is a diagram useful in explaining printing that is carried out with a constant angular velocity for the printed object and constant timing for the ejection of ink droplets according to the third embodiment of a print apparatus according to the present invention.

FIGS. 16 to 21 show a third embodiment of a print apparatus according to the present invention. FIG. 16 is a plan view, FIG. 17 is a perspective view, FIG. 18 is a block diagram showing the flow of signals in the print apparatus shown in FIG. 16, FIG. 19 is a schematic diagram useful in explaining the print apparatus shown in FIG. 16, FIG. 20 is a diagram useful in explaining printing carried out with a constant angular velocity for the printed object and constant timing for the ejection of ink droplets, and FIGS. 21A and 21B are diagrams useful in explaining dot correction weightings. FIGS. 22A and 22B are diagrams useful in explaining a fourth embodiment of a print apparatus according to the present invention and show dot correction weightings.

FIG. 2 and FIG. 3 show an optical disc apparatus 1 (recording medium driving apparatus) that is a first embodiment of a print apparatus according to the present invention. The optical disc apparatus 1 is capable of recording (writing) a new information signal onto and/or reproducing (reading) an information signal that has been recorded in advance from an information recording surface ("recording surface") of an optical disc 101, such as a CD-R or DVD-RW, as a specific example of a "printed object" and is also capable of printing visible information, such as characters and designs, on a label surface (main surface) 101*a* of the optical disc 101 that is a specific example of a "print surface".

As shown in FIGS. 2 to 4, the optical disc apparatus 1 includes a tray 2 that conveys the optical disc 101, a spindle motor 3 that is a specific example of a "rotating unit" for rotating the optical disc 101 conveyed by the tray 2, a recording and/or reproducing unit 5 that writes and/or reads information onto or from the information recording surface of the optical disc 101 rotated by the spindle motor 3, a print unit 6 that prints visible information such as characters and images on the label surface 101*a* of the rotated optical disc 101, and a control unit 7 that controls the recording and/or reproducing unit 5, the print unit 6, and the like.

The tray 2 of the optical disc apparatus 1 includes a plate-like member that is rectangular in planar form and slightly larger than the optical disc 101. A disc holding portion 10 including a circular concave portion for holding the optical disc 101 is provided in an upper surface that is one of the large flat surfaces of the tray 2. The tray 2 is also provided with a cutaway portion 11 to avoid contact with the spindle motor 3 and the like. The cutaway portion 11 is formed in a wide shape from one of the shorter edges of the tray 2 to a central part of the disc holding portion 10. The tray 2 is selectively conveyed to one of a disc attachment position where the optical disc 101 is attached to a disc attachment portion of the spindle motor 3 and a disc eject position which is located outside the apparatus housing and to which the tray 2 is discharged with the optical disc 101 mounted thereupon.

The spindle motor 3 is disposed on a motor base, not shown, so as to be positioned at a substantially central part of the disc holding portion 10 when the tray 2 has been conveyed to the disc attachment position. A turntable 12 including a disc engagement portion 12*a* that detachably engages a center hole 101*b* of the optical disc 101 is provided at a front tip of the rotational shaft of the spindle motor 3.

When the tray 2 has been conveyed to the disc attachment position, the spindle motor 3 is moved upward by raising the motor base using a raising and lowering mechanism, not shown. The disc engagement portion 12*a* of the turntable 12 then engages the center hole 101*b* of the optical disc 101 so that the optical disc 101 is lifted by a predetermined distance from the disc holding portion 10. Also, by operating the raising and lowering mechanism in the opposite direction to lower the motor base, the disc engagement portion 12*a* of the turntable 12 is removed downward from the center hole 101*b* of the optical disc 101 so that the optical disc 101 is mounted onto the disc holding portion 10.

A chucking portion 14 is provided above the spindle motor 3. The chucking portion 14 presses the optical disc 101, which has been lifted by the raising and lowering mechanism of the spindle motor 3, from above. In this manner, the optical disc 101 becomes sandwiched between the chucking portion 14 and the turntable 12, thereby preventing the optical disc 101 from coming off the turntable 12.

The recording and/or reproducing unit 5 includes an optical pickup 16, a pickup base 17 on which the optical pickup 16 is mounted, and a pair of first guide shafts 18*a*, 18*b* that guide the pickup base 17 in the radial direction of the optical disc 101, this direction being a specific example of a "radial direction of a circle traced by a printed object being rotated".

The optical pickup 16 is a specific example of a reading unit that reads information from the optical disc 101 that is a recording medium. The optical pickup 16 includes a light detector, an objective lens, and a biaxial actuator that moves the objective lens close to the information recording surface of the optical disc 101. The light detector of the optical pickup 16 includes a semiconductor laser as a light source that emits a light beam and a light-receiving element that receives a return light beam. The optical pickup 16 focuses a light beam emitted from the semiconductor laser onto the information recording surface of the optical disc 101 using the objective lens and receives a return light beam that has been reflected by the information recording surface via the light detector. Thus, the optical pickup 16 can record (write) an information signal onto or reproduce (read) an already recorded information signal from the information recording surface.

The optical pickup 16 is mounted on the pickup base 17 and moves together with the pickup base 17. The two guide shafts 18*a*, 18*b* are disposed in parallel to the radial direction of the optical disc 101, which in the present embodiment is the direction in which the tray 2 moves, and are slidably inserted through the pickup base 17. In addition, the pickup base 17 can be moved along the two guide shafts 18*a*, 18*b* by a pickup moving mechanism including a pickup motor, not shown. When the pickup base 17 moves, an operation that records and/or reproduces an information signal on the information recording surface of the optical disc 101 is carried out using the optical pickup 16.

As one example, it is possible to use a feed screw mechanism as the pickup moving mechanism that moves the pickup base 17. However, the pickup moving mechanism is not limited to a feed screw mechanism, and as other examples, it is also possible to use a rack and pinion mechanism, a belt feed mechanism, a wire feed mechanism, or other type of mechanism.

The print unit 6 includes a print head 21, a pair of second guide shafts 22*a*, 22*b*, an ink cartridge 23, a head cap 24, a suction pump 25, a waste ink collection unit 26, and a blade 27.

The print head 21 is positioned opposite the label surface 101*a* of the optical disc 101. A plurality of ejection nozzles 31 that eject ink droplets are provided on a surface of the print head 21 that faces the label surface 101*a*. The plurality of ejection nozzles 31 are disposed in four rows that are aligned in the direction in which the print head 21 moves and are set so that ink droplets of a predetermined color are ejected in each row. In the present embodiment, ejection nozzles 31*a* for cyan (C), ejection nozzles 31*b* for magenta (M), ejection nozzles 31*c* for yellow (Y), and ejection nozzles 31*d* for black (K) are disposed in that order from the top in FIG. 2. Also, to remove thickened ink, bubbles, foreign matter, and the like from the ejection nozzles 31*a* to 31*d*, the print head 21 carries out a "dummy ejection" of ink before printing and after printing.

The two second guide shafts 22*a*, 22*b* that are parallel are slidably passed through the print head 21. The print head 21 is capable of being moved along the two second guide shafts 22*a*, 22*b* by a head moving mechanism including a head driving motor 32 (see FIG. 4). A guide shaft support member 33 that extends in a direction perpendicular to the direction in which the tray 2 moves is fixed to one end in the axial direction of each of the two second guide shafts 22*a*, 22*b* and the other ends of the second guide shafts 22*a*, 22*b* extend to the opposite side to the direction in which the tray 2 moves. The print head 21 is constructed so as to be withdrawn to a standby position located on the outside in the radial direction of the optical disc 101 when printing is not being carried out.

The ink cartridge 23 is equipped with a cyan (C) ink cartridge 23*a*, a magenta (M) ink cartridge 23*b*, a yellow (Y) ink cartridge 23*c*, and a black (K) ink cartridge 23*d* corresponding to inks of the respective colors cyan (C), magenta (M), yellow (Y), and black (K). These ink cartridges 23*a* to 23*d* respectively supply ink to the ejection nozzles 31*a* to 31*d* of the print head 21.

The ink cartridges 23*a* to 23*d* each include a hollow vessel and store ink using the capillary action of a porous material enclosed inside the vessel. Connecting portions 35*a* to 35*d* are detachably connected to the openings of the ink cartridges 23*a* to 23*d* so that the ink cartridges 23*a* to 23*d* are connected to the ejection nozzles 31*a* to 31*d* of the print head 21 via the connecting portions 35*a* to 35*d*. This implies that when the ink inside a vessel has been used up, it is possible to easily detach the connection portion from the ink cartridge in question and replace the ink cartridge with a new ink cartridge.

The head cap 24 is provided at the standby position of the print head 21 and is attached to the surface of the print head 21 on which the plurality of ejection nozzles 31 are provided when the print head 21 has moved to the standby position. Thus, it is possible to prevent the ink included in the print head 21 from drying and to prevent dust, dirt, and the like from adhering to the respective ejection nozzles 31*a* to 31*d*. The head cap 24 includes a porous layer and temporarily stores ink that has been dummy ejected by the print head 21 from the respective ejection nozzles 31*a* to 31*d*. The internal pressure of the head cap 24 is adjusted by a valve mechanism, not shown, so as to be equal to atmospheric pressure.

The suction pump 25 is connected to the head cap 24 via a tube 36. When the head cap 24 is attached to the print head 21, the suction pump 25 applies a negative pressure to the internal space of the head cap 24. Thus, the ink inside the respective ejection nozzles 31*a* to 31*d* of the print head 21 and ink that has been dummy ejected by the print head 21 and temporarily stored in the head cap 24 are removed by suction. The waste ink collection unit 26 is connected to the suction pump 25 via a tube 37 and collects the ink that has been sucked out by the suction pump 25.

The blade 27 is disposed between the standby position and the print position of the print head 21. When the print head 21 moves between the standby position and the print position, the blade 27 contacts the respective front end surfaces of the ejection nozzles 31*a* to 31*d* and wipes away ink, dust, dirt, and the like that adhere to the front end surfaces. Note that by providing a moving mechanism that moves the blade 27 up and down, it is also possible to achieve a construction where it is possible to select whether the ejection nozzles 31*a* to 31*d* of the print head 21 are wiped.

FIG. 4 is a block diagram showing the flow of signals in the optical disc apparatus 1. The optical disc apparatus 1 includes the control unit 7, an interface unit 41, a recording control circuit 42, a tray driving circuit 43, a motor driving circuit 44, a signal processing unit 45, an ink ejection driving circuit 46, and a mechanism unit driving circuit 47.

The interface unit 41 is a connection unit for electrically connecting an external apparatus, such as a personal computer or a DVD recorder, to the optical disc apparatus 1. The interface unit 41 outputs signals supplied from the external apparatus to the control unit 7. These signals correspond to "externally stored information" stored by an external apparatus, and examples of such signals include a recording data signal corresponding to information to be recorded on the information recording surface of the optical disc 101 and an image data signal corresponding to visible information to be printed onto the label surface 101*a* of the optical disc 101. The interface unit 41 also outputs a reproduction data signal read by the optical disc apparatus 1 from the information recording surface of the optical disc 101 to the external apparatus.

The control unit 7 includes a central control unit 51, a drive control unit 52, and a print control unit 53. The central control unit 51 controls the drive control unit 52 and the print control unit 53. The central control unit 51 outputs a recording data signal supplied from the interface unit 41 to the drive control unit 52. The central control unit 51 also outputs an image data signal supplied from the interface unit 41 and a position data signal supplied from the drive control unit 52 to the print control unit 53.

The drive control unit 52 controls rotation of the spindle motor 3 and the pickup driving motor (not shown) and controls recording of a recording data signal and reproduction of a reproduction data signal by the optical pickup 16. The drive control unit 52 outputs control signals for controlling rotation of the spindle motor 3, the pickup driving motor, and the tray driving motor to the motor driving circuit 44.

The drive control unit 52 also outputs control signals for controlling a tracking servo and a focus servo to the optical pickup 16 so that the light beam emitted from the optical pickup 16 follows a track on the optical disc 101. In addition, the drive control unit 52 outputs the position data signal supplied from the signal processing unit 45 to the central control unit 51.

The recording control circuit 42 carries out an encoding process, modulation, and the like on a reproduction data signal supplied from the drive control unit 52 and outputs the processed reproduction data signal to the drive control unit 52. The tray driving circuit 43 drives the tray driving motor based on control signals supplied from the drive control unit 52. Thus, the disc tray 2 is conveyed into and out of the apparatus housing.

The motor driving circuit 44 drives the spindle motor 3 based on control signals supplied from the drive control unit 52. Thus, the optical disc 101 mounted on the turntable 12 of the spindle motor 3 is rotated. The motor driving circuit 44 also drives the pickup driving motor based on control signals from the drive control unit 52. Thus, the optical pickup 16 moves together with the pickup base 17 in the radial direction of the optical disc 101.

The signal processing unit 45 carries out demodulation, error detection, and the like on an RF (Radio Frequency) signal supplied from the optical pickup 16 to generate a reproduction data signal. Based on the RF signal, the signal processing unit 45 also detects the position data signal as a signal with a specific pattern, such as a synchronization signal, and/or a signal showing position data for the optical disc 101. As examples, this position data signal can be a rotation angle signal showing the rotation angle of the optical disc 101 and a rotation position signal showing the rotation position of the optical disc 101. The reproduction data signal and the position data signal are outputted to the drive control unit 52.

The print control unit 53 controls the print unit 6 which includes the print head 21 and the head driving motor 32 to have printing carried out on the label surface 101*a* of the optical disc 101. The print control unit 53 generates ink ejection data based on the image data obtained according to an image data signal supplied from the central control unit 51. The generation of the ink ejection data is described in detail later in this specification. The print control unit 53 generates control signals that control the print unit 6 based on the generated ink ejection data and the position data signal supplied from the central control unit 51 and outputs the control signals to the ink ejection driving circuit 46 and the mechanism unit driving circuit 47.

The ink ejection driving circuit 46 drives the print head 21 based on control signals supplied from the print control unit 53. As a result, ink droplets are ejected from the ejection nozzles 31 of the print head 21 and drip onto the label surface 101*a* of the optical disc 101 that is being rotated. The mechanism unit driving circuit 47 drives the head cap 24, the suction pump 25, the blade 27, and the head driving motor 32 based on control signals supplied from the print control unit 53. By driving the head driving motor 32, the print head 21 is moved in the radial direction of the optical disc 101.

The visible information is handled in the external apparatus as image data where tone values showing the luminance of the respective colors red (R), green (G), and blue (B) are expressed using biaxial perpendicular (X-Y) coordinates. Accordingly, the visible information is supplied to the central control unit 51 of the control unit 7 as the image data described above and is then inputted into the print control unit 53.

FIG. 5 is a flowchart showing a process with which the print control unit 53 generates the ink ejection data based on the image data. To generate the ink ejection data, first in step S1, image data expressed by tone values for the respective colors red (R), green (G), and blue (B) is converted into CYMK data expressed as distributions of dots (pixels) of the respective colors cyan (C), yellow (Y), magenta (M), and black (K). The dots that express this CYMK data have tone values that are based on the image data and in the present embodiment the tone values are in a range of 0 to 255, inclusive (i.e., 8-bit values).

Also, the CYMK data is divided into cyan data expressed by the distribution of cyan (C) dots, magenta data expressed by the distribution of magenta (B) dots, yellow data expressed by the distribution of yellow (Y) dots, and black data expressed by the distribution of black (K) dots. All of such data are transferred to the next step, but in the present embodiment cyan data is described below as a representative example.

Next, in step S2, the cyan data expressed by biaxial perpendicular coordinates is converted to polar (r-θ) coordinate data (the same applies to magenta data, yellow data, and black data). The resolution is converted using a common method such as nearest neighbor, bilinear, or high-cubic to produce polar coordinate data of a suitable size for the label surface 101*a* of the optical disc 101.

The conversion to polar coordinate data will now be described with reference to FIG. 6A to FIG. 6C. First, as shown in FIG. 6A, as one example, visible information including a character string "ABCDEFGH" is inputted into the print control unit 53 as image data via the interface unit 41 and the central control unit 51. When the image data is inputted, as shown in FIG. 6B the print control unit 53 stores the character string "ABCDEFGH" as data in an X-Y coordinate system in a memory, not shown.

Next, as shown in FIG. 6C, the radius r from the center of rotation of the optical disc 101 and an angle θ expressed relative to an origin for measuring rotation angles are calculated for each dot (pixel) that composes the data expressed in the X-Y coordinate system. Thus, it is possible to convert the visible information from biaxial perpendicular (X-Y) coordinate data to polar (r-θ) coordinate data. Note that the calculations carried out for such conversion can be carried out using a common method such as nearest neighbor or linear interpolation.

Next, in step S3, dot density correction is carried out on the polar coordinate data to calculate dot correction data. "Dot density correction" refers to a calculation that applies a correction weighting to the tone value of each dot in the polar coordinate data. That is, dot density correction is a calculation that reduces the tone values of dots in accordance with how close the dots are to the inner periphery of the polar coordinate data to increase the luminance used to express each dot.

The correction weighting used for the dot density correction is calculated based on the ratio of the number of dots per unit area centered on the dot to be weighted to the number of dots per unit area centered on a dot positioned in the outermost periphery of the polar coordinate data. For example, if the number of dots per unit area for a dot $d_i$ to be weighted is expressed as u and the number of dots per unit area of the a $d_N$ positioned in the outermost periphery of the polar coordinate data is expressed as v, the weighting $W(d_i)$ for the dot $d_i$ is calculated by the following equation.

$$W(d_i)=v/u$$

The correction weighting W for each dot is calculated as described above and is stored in a memory, not shown. Later, by reading a suitable correction weighting W from the memory when carrying out dot density correction, it is possible to apply a correction weighting to each dot. However, if a correction weighting W is calculated for each dot and stored in a memory, there will be an increase in the storage capacity of the memory. Accordingly, in the present embodiment, correction weightings that are approximately calculated as used as a second specific example of the correction weightings.

This approximate calculation of the correction weightings will now be described with reference to FIG. 7. In the present embodiment, the correction weightings for the dot density correction are calculated based on the ratio of the radius of the dot to be weighted to the radius of dots positioned in the outermost periphery of the polar coordinate data. That is, as shown in FIG. 7, if the radius of a dot $d_i$ to be weighted is expressed as $r_i$ and the radius of dots $d_N$ positioned in the outermost periphery of the polar coordinate data is expressed as $r_N$, the weighting $W(d_i)$ for the dot $d_i$ is calculated by the following equation.

$$W(d_i)=r_i/r_N$$

For example, if the radius of the dot $d_i$ is 30 mm and the radius of the dot $d_N$ is 60 mm, the weighting $W(d_i)$ for the dot $d_i$ is 0.5.

If the correction weighting W for each dot is calculated as described above, it is possible to use the same correction weighting for dots at the same radius and therefore possible to reduce the number of correction weightings to be stored in a memory. As a result, it is possible to reduce the capacity of the memory and to reduce the power consumed by the memory.

Next, in step S4, the dot correction data is binarized according to an error diffusion method to generate the ink ejection data. The ink ejection data is data that expresses whether ink droplets are to be ejected at each position corresponding to a dot on the label surface 101*a* of the optical disc 101. In the present embodiment, the tone values of the dots in the dot correction data are expressed as values from 0 to 255 (i.e., 8-bit values) and the tone values of the dots in the ink ejection data that has been binarized according to the error diffusion method are expressed using the values 0 and 255 (i.e., 1-bit values). Ink droplets are dripped onto positions on the label surface 101*a* corresponding to the dots whose tone values are 255 but are not dripped onto positions corresponding to the dots whose tone values are 0.

In the ink ejection data, dots show the positions where the ink droplets are dripped. By generating the ink ejection data by binarization according to an error diffusion method after the dot density correction has been carried out in step S3, it is possible to reduce the number of ink droplets to be ejected as the distance from the inner periphery of the label surface 101*a* falls. Note that the Floyd & Steinberg method and the Jarvis, Judice & Ninke method can be given as examples of such error diffusion.

Next, in step S5 the print control unit 53 divides the ink ejection data in accordance with the number of ejection nozzles 31 provided on the print head 21 and sets the order for ejecting the ink droplets. Although the ink ejection data may be divided into three, the number of pieces into which the ink ejection data is divided may be set either at two or below, or at four or more in accordance with the number of ejection nozzles 31. Note that when a print head that can print on the entire label surface 101*a* during a single revolution of the optical disc 101 is provided, it is possible to omit this process that divides the ink ejection data.

Figures 8A, 8B, 8C, 8D, 8E, 8F:
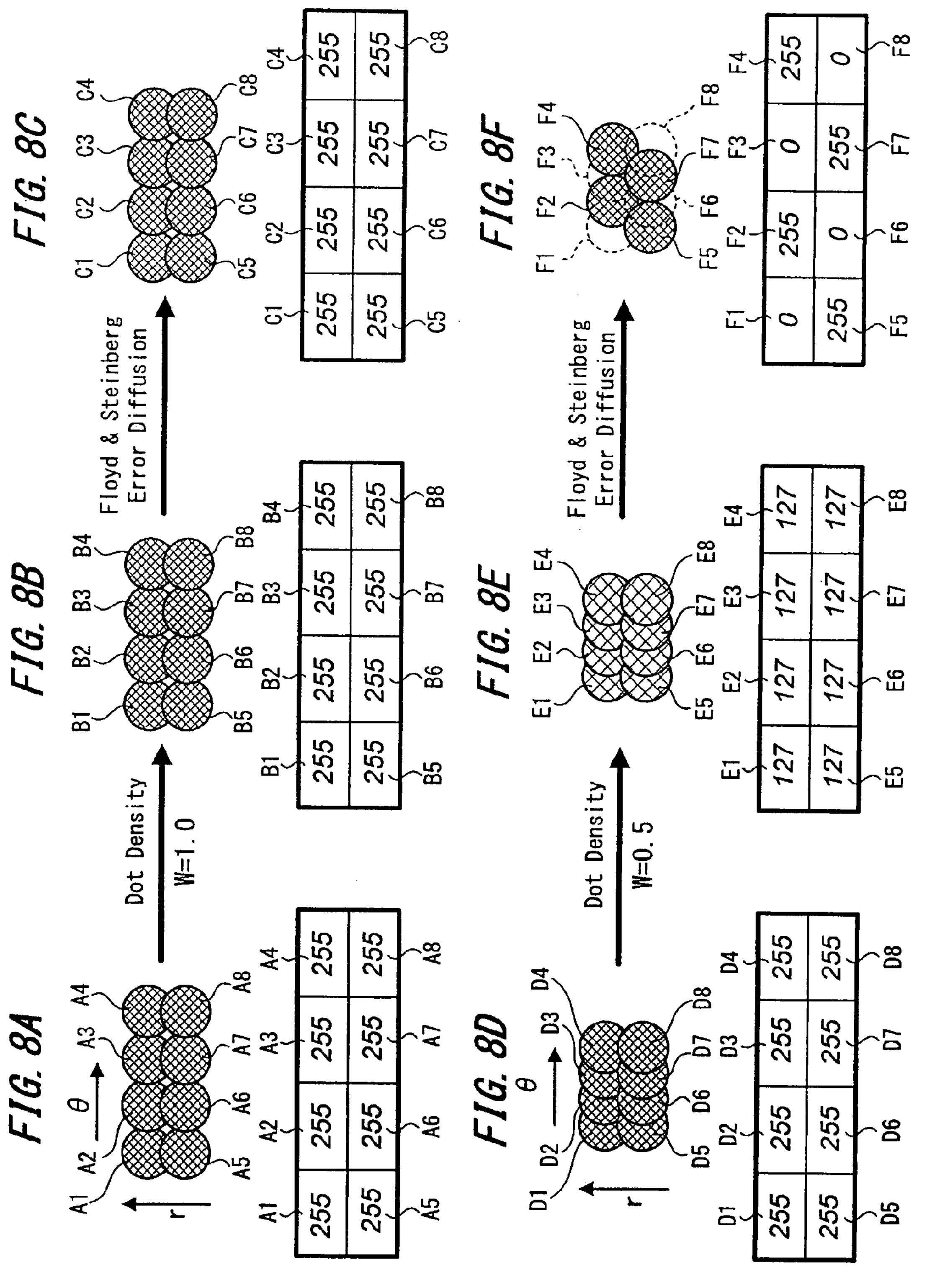
FIGS. 8A to 8F are diagrams useful in explaining a process that generates the ink ejection data from the polar coordinate data according to the first embodiment of a print apparatus of the present invention.

The generation of the ink ejection data executed as described earlier will now be described with reference to FIGS. 8A to 8F and FIGS. 9A to 9J using specific numeric values. FIG. 8A shows dots A1 to A4 that are positioned at an outermost periphery of the polar coordinate data and have a radius value $r_N$ of 60 mm and dots A5 to A8 that are positioned one line inside the dots A1 to A4 and have a radius value $r_{N-1}$ of approximately 60 mm. The tone values of these dots A1 to A8 are all 255.

To generate ink ejection data from such polar coordinate data, first a correction weighting W is applied to each of the dots A1 to A8 of the polar coordinate data to calculate the dot correction data. The correction weighting $W_{N-1}$ for the dots A1 to A4 is calculated as $$W_N=r_N/r_N$$

$$r_N=60$$

so that the correction weighting $W_N$ is 1.0. In the same way, the correction weighting $W_N$ for the dots A5 to A8 is calculated as $$W_{N-1}=r_{N-1}/r_N$$

$$r_{N-1}=\text{approximately } 60$$

$$r_N=60$$

so that the correction weighting $W_{N-1}$ is approximately 1.0. As a result, as shown in FIG. 8B, the tone values of the dots B1 to B8 of the dot correction data are all 255.

Next, Floyd & Steinberg error diffusion (with a threshold of 128) is carried out on the dots B1 to B8 of the dot correction data to binarize the data and generate ink ejection data like that shown in FIG. 8C. The error diffusion calculation will be described in detail later with reference to FIGS. 9A to 9J. As shown in FIG. 8C, the tone values of the dots C1 to C8 of the generated ink ejection data are all 255. As a result, ink droplets are dripped onto positions on the label surface 101*a* of the optical disc 101 that correspond to the dots C1 to C8 of the ink ejection data.

FIG. 8D shows dots D1 to D4 in the polar coordinate data that have a radius $r_i$ of 30 mm and dots D5 to D8 that are positioned one line inside the dots D1 to D4 and have a radius $r_{i-1}$ of approximately 30 mm. The tone values of these dots D1 to D8 are all 255.

To generate ink ejection data from such polar coordinate data, first a correction weighting is applied to each of the dots D1 to D8 of the polar coordinate data to calculate the dot correction data. The correction weighting $W_i$ for the dots D1 to D4 is calculated as $$W_i=r_i/r_N$$

$r_i=30$ $r_N=60$ so that the correction weighting $W_i$ is 0.5. In the same way, the correction weighting $W_{i-1}$ for the dots D5 to D8 is calculated as $$W_{i-1}=r_{i-1}/r_N$$

$$r_{i-1}=\text{approximately } 30$$

$$r_N=60$$

so that the correction weighting $W_{i-1}$ is approximately 0.5.

As a result, as shown in FIG. 8E, the tone values of the dots E1 to E8 of the dot correction data are all 127 (digits following a decimal point are discarded).

Next, Floyd & Steinberg error diffusion (with a threshold of 128) is carried out on the dots E1 to E8 of the dot correction data shown in FIG. 8E to binarize the data and generate ink ejection data as shown in FIG. 8F. The error diffusion calculation will now be described in detail with reference to FIGS. 9A to 9J.

Figures 9A, 9B, 9C, 9D, 9E, 9F, 9G, 9H, 9I, 9J:
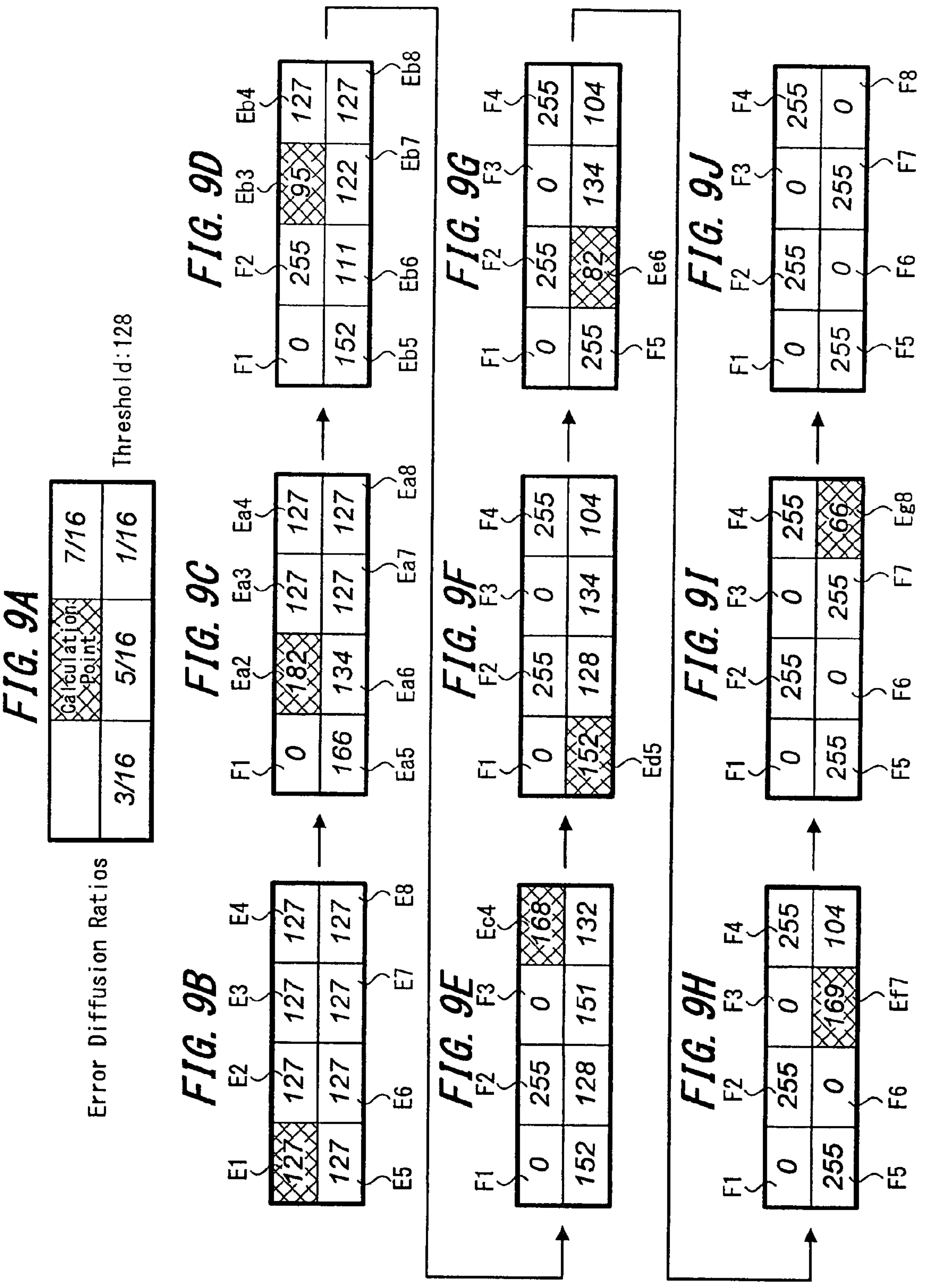
FIGS. 9A to 9J are diagrams useful in explaining a calculation process of an error diffusion method used when generating ink ejection data from dot correction data according to the first embodiment of the print apparatus of the present invention.

FIG. 9A shows error diffusion ratios used by Floyd & Steinberg error diffusion. FIG. 9B shows tone values of the dot correction data shown in FIG. 8E. FIG. 9J shows tone values of the ink ejection data shown in FIG. 8F. In addition, FIG. 9C to FIG. 9I show the calculation process for Floyd & Steinberg error diffusion when generating the ink ejection data shown in FIG. 9J from the dot correction data shown in FIG. 9B.

The error diffusion calculation carried out on the dot correction data described earlier can be carried out as follows, for example. First, the tone value of the dot F1 in the ink ejection data is calculated with the dot E1 in the dot correction data shown in FIG. 9B as a calculation point. This calculation sets the tone value of F1 at 0 if the tone value of the dot that is the calculation point is below the 128 threshold or at 255 if the tone value is above the 128 threshold. That is, since the tone value 127 of the dot E1 that is the calculation point is below the 128 threshold, the tone value of the dot F1 is set at 0 as shown in FIG. 9C.

Next, based on the error diffusion ratios shown in FIG. 9A, the tone values of the dots Ea2, Ea5, Ea6 shown in FIG. 9C are calculated. This calculation distributes the difference of 127 (=127−0) between the tone value 127 of the dot E1 that is the calculation point and the tone value 0 of the dot F1 among the tone values of the dots E2, E5, E6 based on the error diffusion ratios and sets the results as the tone values of the dots Ea2, Ea5, Ea6. That is, the tone values of the dots Ea2, Ea5, Ea6 are calculated according to the following equations $$Ea2=E2+(E1-F1)\times 7/16$$

$$Ea5=E5+(E1-F1)\times 5/16$$

$$Ea6=E6+(E1-F1)\times 1/16$$

(where symbols such as E1, E2, Ea2 represent tone values). As one example, the tone value of the tone Ea2 is calculated as $$127+(127-0)\times 7/16=182.$$

As a result, as shown in FIG. 9C, the tone value of the dot Ea2 is 182, the tone value of the dot Ea5 is 166, and the tone value of the dot Ea6 is 134. In addition, the tone values of the dots E3, E4, E7, E8 are transferred to the tone values of the dots Ea3, Ea4, Ea7, Ea8 to which no values are distributed based on the error diffusion ratios, resulting in all such values becoming 127.

Next, the tone value of the dot F2 in the ink ejection data is calculated with the dot Ea2 in the dot correction data shown in FIG. 9C as a calculation point. Since the tone value 182 of the dot Ea2 that is the calculation point is above the 128 threshold, the tone value of the dot F2 is set at 255 as shown in FIG. 9D.

Next, the difference of −73 (=182−255) between the tone value 182 of the dot Ea2 that is the calculation point and the tone value 255 of the dot F2 is distributed among the tone values of the dots Ea3, Ea5, Ea6, Ea7 based on the error diffusion ratios to calculate the tone values of the dots Eb3, Eb5, Eb6, Eb7 shown in FIG. 9D. That is, the tone values of the dots Eb3, Eb5, Eb6, Eb7 are calculated by the following equations $$Eb3=Ea3+(Ea2-F2)\times 7/16$$

$$Eb5=Ea5+(Ea2-F2)\times 3/16$$

$$Eb6=Ea6+(Ea2-F2)\times 5/16$$

$$Eb7=Ea7+(Ea2-F2)\times 1/16$$

(where symbols such as Ea2, Eb3 represent tone values). As one example, the tone value of the tone Eb3 is calculated as $$127+(182-255)\times 7/16=95.$$

As a result, as shown in FIG. 9D, the tone value of the dot Eb3 is 95, the tone value of the dot Eb5 is 152, the tone value of the dot Eb6 is 111, and the tone value of the dot Eb7 is 122. In addition, the tone values of the dots Ea4, Ea8 are transferred to the tone values of the dots Eb4, Eb8 to which no values are distributed based on the error diffusion ratios, resulting in both such values becoming 127.

Next, by carrying out calculation with the dot Eb3 as the calculation point, the tone value 0 of the dot F3, the tone value 168 of the dot Ec4, and the like are calculated as shown in FIG. 9E. After this, by carrying out calculation with the dot Ec4 as the calculation point, the tone value 255 of the dot F4, the tone value 152 of the dot Ed5, and the like are calculated as shown in FIG. 9F. Next, by carrying out calculation with the dot Ed5 as the calculation point, the tone value 255 of the dot F5, the tone value 82 of the dot Ee6, and the like are calculated as shown in FIG. 9G.

After this, by carrying out calculation with the dot Ee6 as the calculation point, the tone value 0 of the dot F6, the tone value 169 of the dot Ef7, and the like are calculated as shown in FIG. 9H. Next, by carrying out calculation with the dot Ef7 as the calculation point, the tone value 255 of the dot F7, the tone value 66 of the dot Eg8, and the like are calculated as shown in FIG. 9I. After this, by carrying out calculation with the dot Eg8 as the calculation point, the tone value 0 of the dot F8 is calculated as shown in FIG. 9J.

In this manner, by binarizing the dot correction data shown in FIG. 9B and FIG. 8E, the print control unit 53 can generate the ink ejection data shown in FIG. 9J and FIG. 8F. Next, by carrying out printing using such ink ejection data, it is possible to reduce the number of ejected ink droplets while still corresponding to the visible information as the distance from the inner periphery of the label surface 101*a* falls and thereby possible to make the print density of the visible information printed on the label surface 101*a* substantially uniform.

The dots A1 to A8 in the polar coordinate data shown in FIG. 8A and the dots D1 to D8 in the polar coordinate data shown in FIG. 8D are expressed as the same print density in the image data expressed by biaxial perpendicular coordinates that is the data before conversion. Suppose that the dots A1 to A8 and D1 to D8 in the polar coordinate data are simply binarized using the threshold 128, for example, to generate ink ejection data. In this case, the tone values of the dots C1 to C8 and F1 to F8 in the ink ejection data all become 255.

Accordingly, ink droplets would be dripped at all of the positions on the label surface 101*a* of the optical disc 101 that correspond to the dots C1 to C8 and F1 to F8. However, since the dots F1 to F8 of the ink ejection data have narrower intervals in the θ direction than the dots C1 to C8 of the ink ejection data, the print density of the part corresponding to the dots F1 to F8 would be darker than the print density of the part corresponding to the dots C1 to C8.

On the other hand, the ink ejection data according to an embodiment of the present invention is generated by carrying out dot density correction on the polar coordinate data and then binarizing the data according to an error diffusion method. Thus, although the tone values of the dots C1 to C8 of the ink ejection data all become 255, out of the dots F1 to F8 of the ink ejection data, the tone values of the dots F2, F4, F5, F7 become 255 and the tone values of the dots F1, F3, F6, F8 become 0. That is, in the ink ejection data corresponding to the radius $r_i$=30 mm, dots with the tone value 0 and dots with the tone value 255 are alternately aligned (in a staggered pattern) so that the number of ejected ink droplets is reduced to half.

When the number of ejected ink droplets is halved, the intervals in the θ direction between the dots F2, F4, F5, F7 in the ink ejection data approximately match the intervals in the θ direction between the dots C1 to C8 of the ink ejection data corresponding to the radius $r_N$=60 mm. Thus, it is possible to make the print density corresponding to the dots F1 to F8 and the print density of the part corresponding to the dots C1 to C8 approximately equal. As a result, it is possible to make the print density of the visible information printed on the label surface 101*a* approximately uniform.

Although externally stored information supplied from the external apparatus is used as the visible information in the present embodiment, the visible information for the present invention is not limited to this. It is also possible to use information read from the optical disc 101 by the optical pickup 16 as the visible information for the present invention. Specific examples of information read from the optical disc 101 include file management information such as the program title of a television program or the title of music recorded on the optical disc 101, which may be an image and/or characters recorded on the optical disc 101.

FIGS. 10 to 15 are diagrams useful in explaining an optical disc apparatus that is a second embodiment of a print apparatus according to the present invention. The optical disc apparatus according to the second embodiment differs to the optical disc apparatus 1 according to the first embodiment in that dots in the polar coordinate data are thinned. Accordingly since the construction of the optical disc apparatus according to the second embodiment is the same as the construction of the optical disc apparatus 1 according to the first embodiment, detailed description of the construction of the optical disc apparatus according to the second embodiment is omitted.

Since the process that generates the ink ejection data according to the second embodiment is substantially the same as the process that generates the ink ejection data according to the first embodiment, the process will be described with reference to FIG. 5. First, in the same way as in the first embodiment, in step S1, the image data is converted into CYMK data expressed as distributions of dots of the respective colors cyan (C), yellow (Y), magenta (M), and black (K). The dots that express this CYMK data have tone values that are based on the image data and in the present embodiment are values in the range of 0 to 255 inclusive (i.e., 8-bit values). The CYMK is divided into cyan data, yellow data, magenta data, and black data.

Next, in step S2, the cyan data expressed by biaxial perpendicular coordinates is converted to polar (r-θ) coordinate data (the same applies to magenta data, yellow data, and black data). The print control unit 53 according to the second embodiment thins the dots in the polar coordinate data by a predetermined number. This thinning of dots will be described with reference to FIG. 10A and FIG. 10B.

FIG. 10A is a diagram useful in explaining the polar coordinate data converted from data, such as cyan data, expressed using biaxial perpendicular coordinates. In FIG. 10A, dot $d_N$ represents a dot in the outermost periphery at a radius $r_N$. In the same way, dot $d_{i1}$ represents a dot at a radius $r_N/2$, and dot $d_{i2}$ represents a dot at a radius $r_N/4$.

As shown in FIG. 10A, in the polar coordinate data converted from the data expressed by biaxial perpendicular coordinates, the number of dots aligned in the circumferential direction is the same at different radii. Accordingly, the respective intervals in the circumferential direction between the dots $d_{i1}$ and between the dots $d_{i2}$ are narrower than the interval in the circumferential direction between the dots $d_N$. On the other hand, the case where the respective intervals in the circumferential direction between the dots $d_{i1}$ and between the dots $d_{i2}$ are set approximately equal to the interval in the circumferential direction between the dots $d_N$ is shown in FIG. 10B.

As shown in FIG. 10B, since the length in the circumferential direction (i.e., the circumference) of a circle is proportionate to the radius r, if the number of dots $d_{i1}$ at the radius $r_N/2$ is set at half the number of dots $d_N$ at the radius r, it is possible to make the interval in the circumferential direction approximately equal for the dots $d_{i1}$ and the dots $d_N$. In the same way, if the number of dots $d_{i2}$ at the radius $r_N/4$ is set at one quarter of the number of dots $d_N$, it is possible to make the interval in the circumferential direction approximately equal for the dots $d_{i2}$ and the dots $d_N$. Accordingly, if the radius of the dots in the outermost periphery is expressed as $r_N$, thinning is carried out according to the second embodiment so that the number of dots with a radius $r_i$ under the condition of $r_N/2^n < r_i \leqq r_N/2^{n-1}$ is reduced to $1/2^{n-1}$ of the number of dots at the radius $r_N$.

For example, when 1 is substituted into n with 60 mm as the radius $r_N$, the range of the radius $r_i$ is given as $$30<r_i\leqq 60.$$

When thinning dots at a radius $r_i$ that satisfies $30<r_i\leqq 60$, the equation $1/2^{n-1}$ produces the value 1/1. That is, thinning is not carried out for dots with a radius of above 30 mm but no greater than 60 mm.

Next, when 2 is substituted into n, the range of the radius $r_i$ is given as $$15<r_i\leqq 30.$$

When thinning dots at a radius $r_i$ that satisfies $15<r_i\leqq 30$, the equation $1/2^{n-1}$ produces the value 1/2. That is, thinning is carried out for dots at a radius of above 15 mm but no greater than 30 mm so that the number of dots is halved. In this manner, the proportion of dots to be thinned is determined according to the radial position $r_i$, so that polar coordinate data that has been thinned by a predetermined number of dots is generated.

Next, in step S3, dot density correction is carried out on the polar coordinate data that has been thinned by a predetermined number of dots to calculate the dot correction data. The correction weightings W for the dot density correction are calculated according to $2^{n-1}r_i/r_N$ corresponding to the thinning of dots in the polar coordinate data. FIG. 11 is a diagram useful in explaining the correction weightings used in the second embodiment. In FIG. 11, a plurality of dots $d_i$ at a radius $r_i=r_N/2$ and a plurality of dots $d_{i+1}$, at a radius $r_{i+1}$ that is one line outside the plurality of dots $d_i$ are shown, where $r_N$ is the radius of the dots in the outermost periphery.

Here, the correction weighting $W(d_i)$ for the dots $d_i$ is calculated as follows. Since the radius $r_i$ of the dots $d_i$ is $r_N/2$, n=2 is calculated according to $$r_N/2^n<r_i\leqq r_N/2^{n-1}$$

$$r_i=r_N/2.$$

Accordingly, the correction weighting $W(d_i)$ for the dots di is calculated as $W(d_i)=1.0$ according to $$W(d_i)=2^{n-1}r_i/r_N$$

$$r_i=r_N/2$$

$$n=2.$$

The correction weighting $W(d_{i+1})$ for the dots $d_{i+1}$ is calculated as follows. Since the radius $r_{i+1}$ of the dots $d_{i+1}$ satisfies the condition of $r_N/2<r_{i+1}\leqq r_N$, n=1 is calculated according to $$r_N/2^n<r_{i+1}\leqq r_N/2^{n-1}$$

$$r_N/2<r_{i+1}\leqq r_N.$$

Accordingly, the correction weighting $W(d_{i+1})$ for the dots $d_{i+1}$ is calculated as $W(d_{i+1})=r_{i+1}/r_N$ according to $$W(d_{i+1})=2^{n-1}r_{i+1}/r_N$$

$$n=1.$$

Note that since the dots $d_{i+1}$ are one line outside the dots $d_i$, it is possible to assume that $r_{i+1}\approx r_N/2$. Thus, the correction weighting $W(d_{i+1})$ is given by $$W(d_{i+1})\approx 0.5.$$

Next, in step S4, the dot correction data is binarized using an error diffusion method to generate the ink ejection data that shows where ink droplets are to be dripped at positions on the label surface of the optical disc 101 that correspond to the respective dots. In the second embodiment, since the dots are thinned by a predetermined number in step S2, predetermined error diffusion ratios are used for dots at a radius where the thinning ratio changes, that is, for the radius $r_N/2^n$ and the dots one line outside. Note that in the same way as in the first embodiment, normal error diffusion ratios are used for the dots with the radius $r_N/2^n$ and the dots one line outside.

As shown in FIG. 12, the number of dots $d_i$ with the radius $r_N/2^n$ becomes one half of the number of dots $d_{i+1}$ that are one line outside the dots $d_i$. This implies that when error diffusion is carried out, some of the dots used in calculation for the dot $d_k$ as the calculation point are no longer present. Accordingly, the error diffusion ratios shown in FIG. 13 and FIG. 14 are used for the dots with the radius $r_N/2^n$ and the dots one line outside.

Figure 13A:
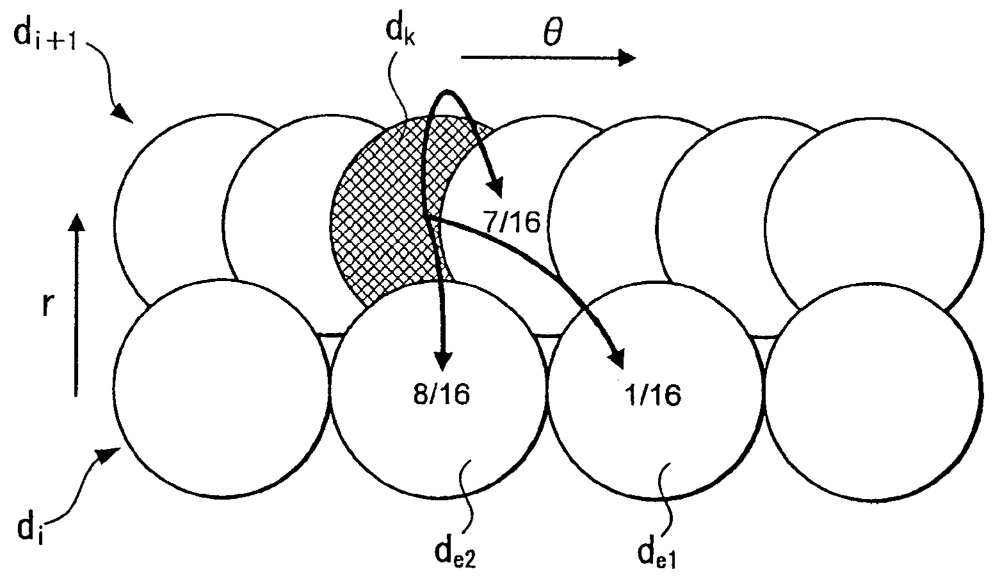
FIGS. 13A and 13B are second diagrams useful in explaining the error diffusion method used by the second embodiment of a print apparatus according to the present invention.

FIG. 13A shows the error diffusion ratios for the case where there is no dot on either side diagonally below the dot $d_k$ that is the calculation point. In this case, the error diffusion ratio of 1/16 that is normally applied to the dot diagonally below to the right is instead applied to the dot $d_{e1}$ that is adjacent to the right of such position. Also, the error diffusion ratio of 3/16 that is normally applied to the dot diagonally below to the left is added to the error diffusion ratio of 5/16 normally applied to the dot $d_{e2}$ directly below. That is, the error diffusion ratio applied to the dot $d_{e2}$ directly below is set at 8/16.

Figure 13B:
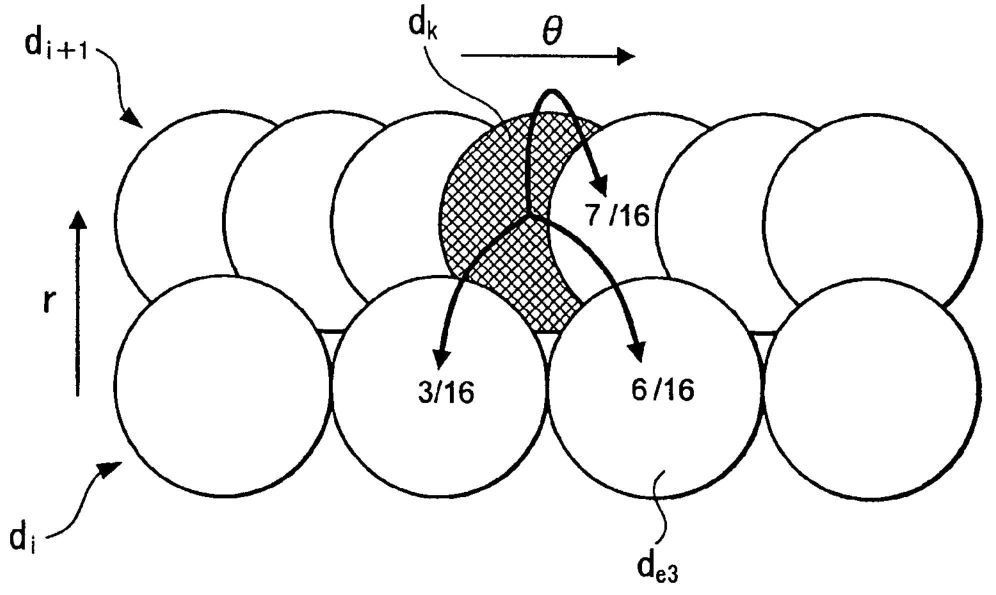

FIG. 13B shows the error diffusion ratios for the case where there is no dot directly below the dot $d_k$ that is the calculation point. In this case, the error diffusion ratio of 5/16 normally applied to the dot directly below is added to the error diffusion ratio of 1/16 that is normally applied to the dot $d_{e3}$ diagonally below to the right. That is, the error diffusion ratio applied to the dot $d_{e3}$ diagonally below to the right is set at 6/16.

Next, in step S5 shown in FIG. 5, in the same way as in the first embodiment, the ink ejection data is divided into pieces of sizes corresponding to the number of ejection nozzles 31 provided on the print head 21 and the order in which the ink droplets are ejected is set.

Figures 14A, 14B, 14C:
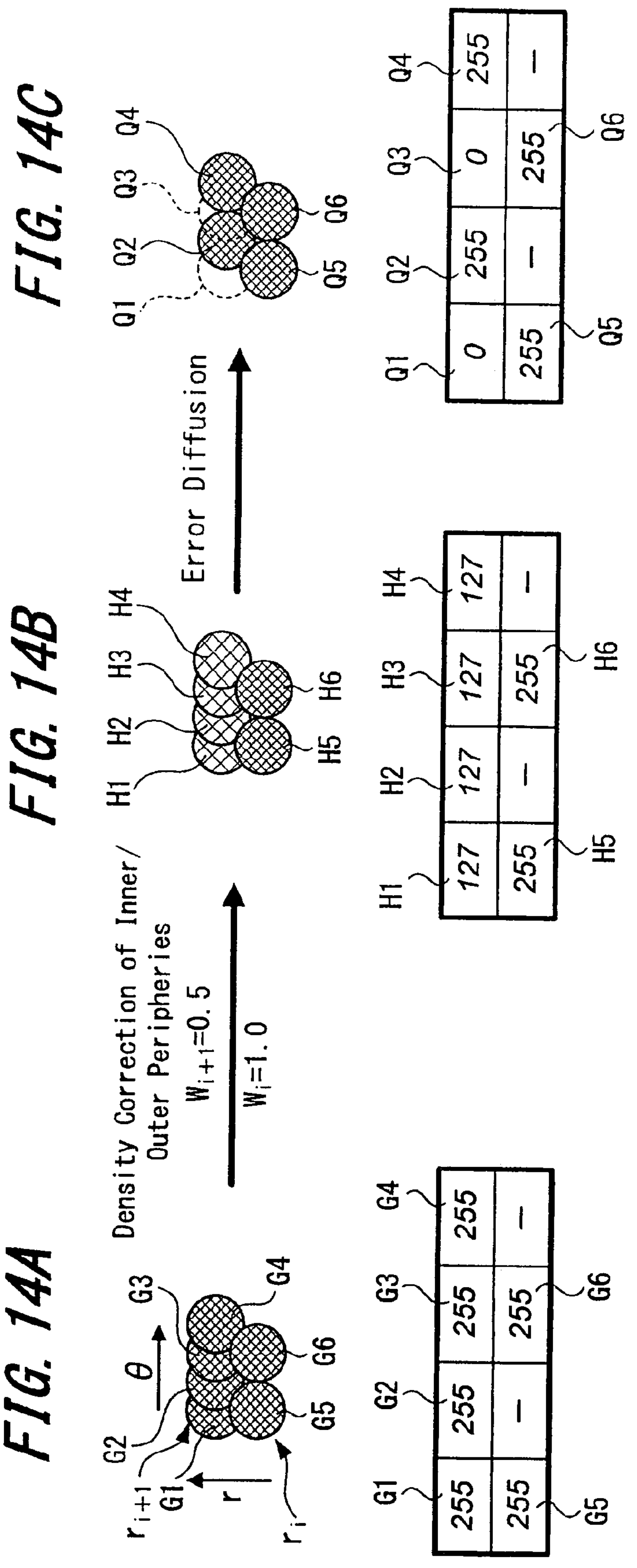
FIGS. 14A to 14C are diagrams useful in explaining a process that generates ink ejection data from the polar coordinate data according to the second embodiment of a print apparatus according to the present invention.

The generation of ink ejection data executed as described earlier will now be described using specific numeric values with respect to FIGS. 14 to 15. FIG. 14A shows the polar coordinate data after a predetermined number of dots have been thinned in step S2 shown in FIG. 5. In FIG. 14A, the dots G5, G6 at a radius $r_i$=30 mm for the case where the radius $r_N$ of the dots positioned in the outermost periphery of the polar coordinate data is 60 mm and the dots G1 to G4 with a radius of $r_{i+1}$=approximately 30 mm (30 mm<$r_{i+1}$) positioned one line outside the dots G5, G6 are shown. The tone values of the dots G1 to G6 are all 255.

To generate the ink ejection data from the polar coordinate data, first the dot correction data is calculated by applying correction weightings to the dots G1 to G6 of the polar coordinate data (step S3). The correction weightings $W_{i+1}$ for the dots G1 to G4 are calculated according to $$W_{i+1}=r_{i+1}/r_N$$

$$r_{i+1}=\text{approximately } 30$$

$$r_N=60$$

so that the correction weighting $W_{i+1}$ is 0.5.

Similarly, the correction weightings $W_i$ for the dots G5, G6 are calculated according to $$W_i=2r_i/r_N$$

$$r_i=30$$

$$r_N=60$$

so that the correction weighting $W_i$ is 1.0.

As a result, as shown in FIG. 14B, the tone values of the dots H1 to H4 of the dot correction data all become 127 (digits following a decimal point are discarded) and the tone values of the dots H5, H6 both become 255.

Next, an error diffusion method (with a threshold of 128) is carried out on the dots H1 to H6 of the dot correction data shown in FIG. 14B to binarize the data and generate ink ejection data such as that shown in FIG. 14C (step S4). The calculation of this error diffusion method will be described in detail later with reference to FIGS. 17A to 15I.

Figures 15A, 15B, 15C, 15D, 15E, 15F, 15G, 15H, 15I:
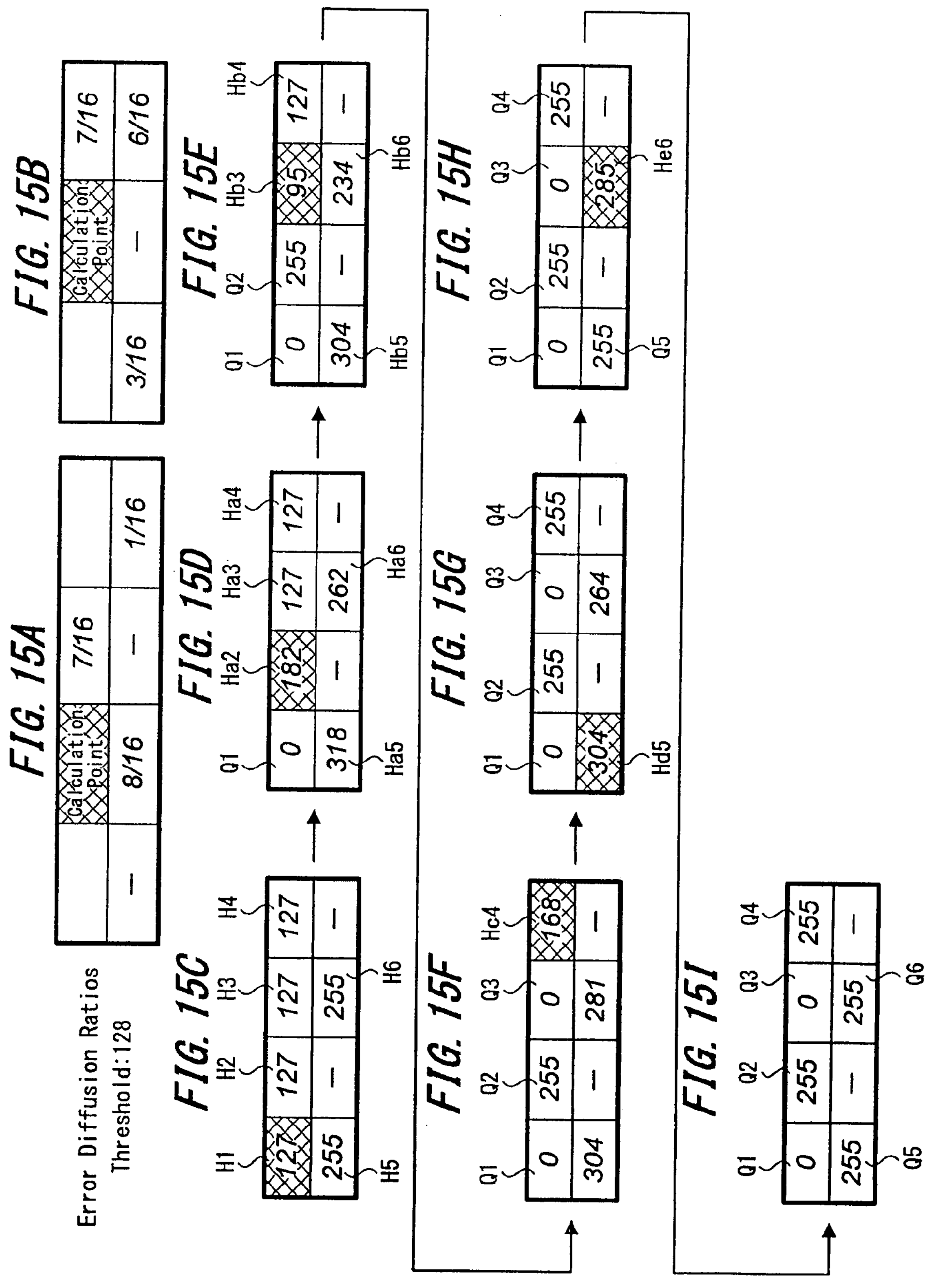
FIGS. 15A to 15I are diagrams useful in explaining a calculation process of an error diffusion method used when generating ink ejection data from the dot correction data according to the second embodiment of a print apparatus according to the present invention.

FIG. 15A and FIG. 15B show error diffusion ratios used for dots with the radius $r_N/2^n$ and the dots one line outside. FIG. 15C shows tone values of the dot correction data shown in FIG. 14B. FIG. 15I shows tone values of the ink ejection data shown in FIG. 14C. In addition, FIG. 15D to FIG. 15H show the calculation process for error diffusion when generating the ink ejection data shown in FIG. 15I from the dot correction data shown in FIG. 15C.

The calculation of the error diffusion method carried out on the dot correction data described above can be carried out as follows. First, a calculation that finds the tone value of the dot Q1 of the ink ejection data is carried out with the dot H1 of the dot correction data shown in FIG. 15C as a calculation point. This calculation is the same as in the first embodiment, so that the tone value of F1 is set at 0 if the tone value of the dot that is the calculation point is below the 128 threshold or at 255 if the tone value of the calculation point is above the 128 threshold. That is, since the tone value 127 of the dot E1 that is the calculation point is below the 128 threshold, the tone value of the dot F1 is set at 0 as shown in FIG. 9C.

Next, the tone values of the dots around the dot Q1 shown in FIG. 15D are calculated. When doing so, since there is no dot diagonally below to the right of the dot H1 that is the calculation point, calculation is carried out based on the error diffusion ratios shown in FIG. 15A. Accordingly, this calculation distributes the difference of 127 (=127−0) between the tone value 127 of the dot E1 and the tone value 0 of the dot Q1 among the tone values of the dots H2, H5, H6 based on the error diffusion ratios shown in FIG. 15A to produce the tone values of the dots Ha2, Ha5, Ha6 shown in FIG. 15D. That is, the tone values of the dots Ha2, Ha5, Ha6 are calculated by the following equations $$Ha2=H2+(H1-Q1)\times 7/16$$

$$Ha5=H5+(H1-Q1)\times 8/16$$

$$Ha6=H6+(H1-Q1)\times 1/16$$

(where symbols such as H1, H2, Ha2 represent tone values).

As one example, the tone value of the dot Ha2 is calculated as $$127+(127-0)\times 7/16=182.$$

As a result, as shown in FIG. 15D, the tone value of the dot Ha2 becomes 182, the tone value of the dot Ha5 becomes 318, and the tone value of the dot Ha6 becomes 262. In addition, the tone values of the dots E3, E4 are transferred to the tone values of the dots Ha3, Ha4 to which no values are distributed based on the error diffusion ratios and which both become 127.

Next, with the dot Ha2 shown in FIG. 15D as a calculation point, the tone value of the dot Q2 in the ink ejection data is calculated. Since the tone value 182 of the dot Ha2 is above the 128 threshold, the tone value of the dot Q2 becomes 255 as shown in FIG. 15B.

Next, the tone values of the dots around the dot Q2 shown in FIG. 15E are calculated. When doing so, since there is no dot directly below the dot Ha2 that is the calculation point, calculation is carried out based on the error diffusion ratios shown in FIG. 15B. Accordingly, the difference of −73 (=182−255) between the tone value 182 of the dot Ha2 and the tone value 255 of the dot Q2 is distributed among the tone values of the dots Ha3, Ha5, Ha6 based on the error diffusion ratios shown in FIG. 15B to calculate the tone values of the dots Hb3, Hb5, Hb6. That is, the tone values of the dots Hb3, Hb5, Hb6 are calculated by the following equations $$Hb3=Ha3+(Ha2-Q2)\times 7/16$$

$$Hb5=Ha5+(Ha2-Q2)\times 3/16$$

$$Hb6=Ha6+(Ha2-Q2)\times 5/16$$

(where symbols such as Ha2, Hb3 represent tone values).

As one example, the tone value of the tone Hb3 is calculated as $$127+(188-255)\times 7/16=95.$$

As a result, as shown in FIG. 15E, the tone value of the dot Hb3 becomes 95, the tone value of the dot Hb5 becomes 304, and the tone value of the dot Hb6 becomes 234. In addition, the tone value of the dot Ha4 is transferred to the tone value of the dot Hb4 to which no value is distributed based on the error diffusion ratios and which becomes 127.

Next, by carrying out calculation with the dot Hb3 as the calculation point, the tone value 0 of the dot Q3, the tone value 168 of the dot Hc4, and the like are calculated as shown in FIG. 15F. After this, by carrying out calculation with the dot Hc4 as the calculation point, the tone value 255 of the dot Q4, the tone value 304 of the dot Hd5, and the like are calculated as shown in FIG. 15G. Next, by carrying out calculation with the dot Hd5 as the calculation point, the tone value 255 of the dot Q5, the tone value 285 of the dot He6, and the like are calculated as shown in FIG. 15H. Next, by carrying out calculation with the dot He6 as the calculation point, the tone value 255 of the dot Q6 is calculated as shown in FIG. 15I.

Thus, by binarizing the dot correction data shown in FIG. 15C and FIG. 14B, the print control unit 53 can generate the ink ejection data shown in FIG. 15I and FIG. 14C. Next, by carrying out printing using this type of ink ejection data, it is possible to reduce the ejection of excess ink droplets in the circumferential direction as the distance from the inner periphery of the label surface 101*a* falls and therefore possible to make the print density substantially uniform in the inner and outer peripheries of the label surface 101*a*.

When converting the image data expressed by the biaxial perpendicular coordinates to the polar coordinate data in the present embodiment, a predetermined number of dots are thinned so that the number of dots at a radius $r_i$ under the condition of $r_N/2^n<r_i\leqq r_N/2^{n-1}$ becomes a predetermined number of dots relative to the number of dots with a radius $r_N$ positioned in the outermost periphery of the polar coordinate data. This implies that it is possible to reduce the amount of data to be stored in a memory, which makes it possible to use the unused storage region of the memory for other data and/or to reduce the capacity of the memory.

FIGS. 16 to 18 are diagrams useful in explaining an optical disc apparatus 60 (recording medium driving apparatus) that is a third embodiment of a print apparatus according to the present invention. In the same way as the optical disc apparatus 1 according to the first embodiment, the optical disc apparatus 60 is capable of recording (writing) a new information signal onto and/or reproducing (reading) an information signal that has been recorded in advance from an information recording surface ("recording surface") of the optical disc 101, such as a CD-R or DVD-RW, as a specific example of a "printed object" and is also capable of printing visible information such as characters and designs on a label surface (main surface) 101*a* of the optical disc 101 that is a specific example of a "print surface".

As shown in FIGS. 16 to 18, the optical disc apparatus 60 includes an apparatus housing 61, a tray 62 that conveys the optical disc 101 inside the apparatus housing 61, a spindle motor 63 (see FIG. 18) that is a specific example of a "rotating unit" for rotating the optical disc 101 conveyed by the tray 62, a recording and/or reproducing unit 65 that writes and/or reads information onto or from the information recording surface of the optical disc 101 rotated by the spindle motor 63, a print unit 66 that prints visible information such as characters and images on the label surface 101*a* of the rotated optical disc 101, and a control unit 67 that controls the recording and/or reproducing unit 65, the print unit 66, and the like.

The apparatus housing 61 of the optical disc apparatus 60 is formed of an approximately rectangular shaped housing whose upper surface is open and includes a front surface plate 61*a* through which the tray 62 passes into and out of, a rear surface plate 61*b* that faces the front surface plate 61*a*, a left-side surface plate 61*c* that forms the left side when viewed from the front, a right-side surface plate 61*d* that forms the right side, and a base plate that forms the base surface. An opening 69 that is formed in a horizontally long rectangular shape is provided in the front plate 61*a* of the apparatus housing 61, with the tray 62 passing in and out through this opening 69.

The tray 62 includes a plate-like member that is rectangular in planar form. A disc holding portion 70 including a circular concave part for holding the optical disc 101 is provided in an upper surface that is one of the large flat surfaces of the tray 62. The tray 62 is also provided with a cutaway portion 71 to avoid contact with the spindle motor 63 and the like. The cutaway portion 71 is formed in a wide shape from one of the shorter edges of the tray 62 to a central part of the disc holding portion 70. The tray 62 is selectively conveyed to one of a disc attachment position where the optical disc 101 mounted on the tray 62 is attached to a disc attachment portion of the spindle motor 63 and a disc eject position which is located outside the apparatus housing and to which the tray 2 is discharged with the optical disc 101 mounted thereupon.

The spindle motor 63 is disposed on a motor base, not shown, so as to be positioned at a substantially central part of the disc holding portion 70 when the tray 62 has been conveyed to the disc attachment position. A turntable including a disc attachment portion that detachably engages a center hole 101*b* of the optical disc 101 is provided at a front tip of the rotational shaft of the spindle motor 63.

A chucking portion 72 is provided above the spindle motor 63. Together with the disc attachment portion, the chucking portion 72 sandwiches the optical disc 101 to prevent the optical disc 101 from coming off the turntable. The chucking portion 72 includes a disc-like chucking plate 73 that faces the disc attachment portion and a support plate 74 that rotatably supports the chucking plate 73. The support plate 74 includes an approximately rectangular plate and rotatably supports the chucking plate 73 at one end thereof in the length direction. The other end of the support plate 74 is attached to a left-side surface plate 62*c* of the apparatus housing 61.

By constructing the support plate 74 in this way, in the present embodiment, a space that allows a print head 81 described later to move is provided above the optical disc 101 attached to the disc attachment portion on the opposite side to the support plate 74. Thus, it is possible for the print head 81 to move across the optical disc 101 in a direction that is parallel to the direction in which the tray 62 moves, thereby making it possible to print on the entire label surface 101*a* of the optical disc 101.

The recording and/or reproducing unit 65 includes an optical pickup 76 that faces the information recording surface of the optical disc 101, a pickup base 77 on which the optical pickup 76 is mounted, and a pickup moving mechanism, not shown, that moves the pickup base 77 in the radial direction of the optical disc 101.

The optical pickup 76 includes a light detector, an objective lens, and a biaxial actuator that moves the objective lens close to the information recording surface of the optical disc 101. The light detector of the optical pickup 76 includes a semiconductor laser as a light source that emits a light beam and a light-receiving element that receives a return light beam. The optical pickup 76 focuses a light beam emitted from the semiconductor laser onto the information recording surface of the optical disc 101 using the objective lens and receives a return light beam from the information recording surface using the light detector. Thus, the optical pickup 76 can record (write) an information signal onto or reproduce (read) an already recorded information signal from the information recording surface.

The optical pickup 76 is mounted on the pickup base 77 and moves together with the pickup base 77. The pickup base 77 can be moved by the pickup moving mechanism in the radial direction of the optical disc 101, which in the present embodiment is parallel to the direction in which the tray 62 moves. As one example, it is possible to use a feed screw mechanism as the pickup moving mechanism that moves the pickup base 77. However, the pickup moving mechanism is not limited to a feed screw mechanism, and as other examples, it is also possible to use a rack and pinion mechanism, a belt feed mechanism, a wire feed mechanism, or other type of mechanism.

The print unit 66 includes the print head 81 that faces the label surface 101*a* of the optical disc 101, a head base 82 on which the print head 81 is mounted, a pair of guide shafts 83*a*, 83*b* that guide the head base 82, a head driving mechanism 84 that moves the head base 82 along the pair of guide shafts 83*a*, 83*b*, and a head cap 85.

A plurality of ejection nozzles 86 that eject ink droplets onto the label surface 101*a* of the optical disc 101 are provided on the print head 81. The print head 81 is mounted on the head base 82 and moves together with the head base 82. The head base 82 is equipped with a pair of shaft bearing portions 82*a*, 82*a* through which one guide shaft 83*a* slidably passes and a pair of shaft bearing portions 82*b*, 82*b* through which the other guide shaft 83*b* slidably passes.

The pair of guide shafts 83*a*, 83*b* extend in the direction in which the tray 62 moves and are respectively fixed at one end to the front surface plate 61*a* of the apparatus housing 61 and at the other end via a guide shaft support member 87 to the rear surface plate 61*b*. The pair of guide shafts 83*a*, 83*b* are disposed at off-center positions toward the right-side surface plate 61*d* of the apparatus housing 61. This implies that the head base 82 and the print head 81 guided by the pair of guide shafts 83*a*, 83*b* are disposed at an off-center position toward the right-side surface plate 61*d* of the apparatus housing 61. Thus, as shown in FIG. 16, the ejection nozzles 86 of the print head 81 move on a movement axis Q that is a specific example of the path that is parallel to the radial direction of the optical disc 101 (that is, the direction in which the standard axis O extends) and pass a position that is offset from the center of rotation of the optical disc 101.

In this manner, by moving the ejection nozzles 86 along the movement axis Q that is offset from the standard axis O, it is possible to prevent the print head 81 from interfering with the chucking plate 73. In addition, it is possible for the ejection nozzles 86 of the print head 81 to move across the optical disc 101 along a direction that is parallel to the direction in which the tray 62 moves, thereby making it possible to print across the entire label surface 101*a* of the optical disc 101.

The head driving mechanism 84 includes a head driving motor 91, a feed screw shaft 92 provided as a rotation shaft for the shaft of the head driving motor 91, a screw shaft support portion 93 that supports the feed screw shaft 92, and a feed nut 94 that is screwed onto the feed screw shaft 92. The head driving motor 91 is fixed to the rear surface plate 61*b* of the apparatus housing 61 and the feed screw shaft 92 that protrudes out of one end of the head driving motor 91 is rotatably supported by the circuit 93. The feed nut 94 is attached to the head base 82 via a connecting member 95 so that movement in the direction in which the screw thread of the feed nut 94 extends is restricted.

When the head driving motor 91 of the head driving mechanism 84 constructed as described above is driven, the rotational force of the feed screw shaft 92 is transmitted via the feed nut 94 and the connecting member 95 to the head base 82. The feed nut 94 moves in the axial direction of the feed screw shaft 92 relative to the feed screw shaft 92 that is rotated at a predetermined position. As a result, the head base 82 moves together with the feed nut 94 and as a result, the head base 82 and the print head 81 selectively move in one of a direction toward the front surface plate 61*a* and a direction toward the rear surface plate 61*b* in accordance with the direction of rotation of the head driving motor 91.

The print head 81 is constructed so as to be withdrawn by the head driving mechanism 84 to a standby position on the outside in the radial direction of the optical disc 101 when printing is not being carried out. A head cap 85 is provided at the standby position of the print head 81. The head cap 85 is attached to the surface of the print head 81 on which the plurality of ejection nozzles 86 are provided when the print head 81 has moved to the standby position. Thus, it is possible to prevent the ink included in the print head 81 from drying and to prevent dust, dirt, and the like from adhering to the ejection nozzles 86.

FIG. 18 is a block diagram showing the flow of signals in the optical disc apparatus 60. Since the flow of signals in the optical disc apparatus 60 is the same as the flow of signals in the optical disc apparatus 1 according to the first embodiment, parts that are the same as for the optical disc apparatus 1 have been assigned the same reference numerals and duplicated description thereof is omitted. In the same way as the control unit 7 of the optical disc apparatus 1 according to the first embodiment, the control unit 67 of the optical disc apparatus 60 includes the central control unit 51, the drive control unit 52, and the print control unit 53.

The central control unit 51 outputs a recording data signal supplied from the interface unit 41 to the drive control unit 52. The central control unit 51 also outputs an image data signal supplied from the interface unit 41 and a position data signal supplied from the drive control unit 52 to the print control unit 53. The drive control unit 52 controls rotation of the spindle motor 63 and the pickup driving motor (not shown) and controls recording of a recording data signal and reproduction of a reproduction data signal by the optical pickup 76.

The print control unit 53 controls the print unit 66 which includes the print head 81 and the head driving motor 91 to have printing carried out on the label surface 101*a* of the optical disc 101. The print control unit 53 generates ink ejection data based on the image data obtained according to an image data signal supplied from the central control unit 51. The print control unit 53 generates control signals that control the print unit 66 based on the generated ink ejection data and the position data signal supplied from the central control unit 51 and outputs control signals to the ink ejection driving circuit 46 and the mechanism unit driving circuit 47.

FIG. 19 schematically shows the ejection nozzles 86 provided on the print head 81 of the optical disc apparatus 60 and the optical disc 101. As shown in FIG. 19, since the ejection nozzles 86 of the print head 81 move along the movement axis Q that is offset from the standard axis O, the intervals between the paths traced by the respective nozzles out of the ejection nozzles 86 when the optical disc 101 rotates become narrower as the distance from the inner periphery of the optical disc 101 falls. FIG. 20 shows the case where printing has been carried out by this optical disc apparatus 60 for an angle θ with the ink droplets 98 being ejected by the print head 81 at constant timing and the optical disc 101 being rotated at a constant rotational velocity.

As shown in FIG. 20, when printing is carried out with both the rotational velocity of the optical disc 101 and the ejection timing of the ink droplets 98 constant, the intervals between the ink in the circumferential direction and the intervals between ink droplets in the radial direction become narrow as the distance from the inner periphery of the optical disc 101 falls. This implies that the amount of ink per unit area is larger in the inner periphery than in the outer periphery of the label surface 101*a*, resulting in a difference in print density between the inner and outer peripheries of the label surface 101*a*. Accordingly, according to the optical disc apparatus 60, the ink ejection data is generated by applying correction weightings corresponding to each dot in the polar coordinate data so that the print density becomes substantially uniform in the inner and outer peripheries of the label surface 101*a*.

By carrying out the procedure shown in FIG. 5 in the same way as the optical disc apparatus 1, the optical disc apparatus 60 generates the ink ejection data based on the image data. That is, in step 1, the print control unit 53 of the optical disc apparatus 60 converts image data expressed by tone values for the respective colors red (R), green (G), and blue (B) into CYMK data expressed as distributions of dots (pixels) of the respective colors cyan (C), yellow (Y), magenta (M), and black (K). Next, in step S2, the cyan data expressed by biaxial perpendicular coordinates is converted to polar (r-θ) coordinate data (the same applies to magenta data, yellow data, and black data). After this, in step S3, dot density correction is carried out on the polar coordinate data to calculate dot correction data.

In the optical disc apparatus 60, the same correction weighting is applied to the tone values of dots at the same radius. That is, the calculation weightings used by the optical disc apparatus 60 are calculated using the ratio of the number of dots per unit area of a dot group at the same radius to be weighted to the number of dots per unit area of a dot group positioned in the outermost periphery of the polar coordinate data. If the number of dots per unit area of the dot $d_i$ group to be weighted is expressed as $D_i$ and the number of dots per unit area of the dot $d_N$ group positioned in the outermost periphery of the polar coordinate data is expressed as $D_N$, the weighting $W(d_i)$ for the dots $d_i$ is calculated by the following equation.

$$W(d_i)=D_i/D_N$$

In the present embodiment, the number of dots $D_N$ per unit area of the dot $d_N$ group and the number of dots $D_i$ per unit area of the dot $d_i$ group are approximately calculated and the correction weighting $W(d_i)$ for the dots $d_i$ is calculated based on the results of such calculations. First, the number of dots $D_N$ per unit area of the dot $d_N$ group will be described. If the number of dots in the dot $d_N$ group positioned in the outermost periphery of the polar coordinate data is expressed as n and the area of the print region to be printed with the dot $d_N$ group positioned in the outermost periphery of the polar coordinate data is expressed as $S_N$, the number of dots $D_N$ per unit area is calculated by the following equation.

$$D_N=n/S_N$$

Figure 21A:
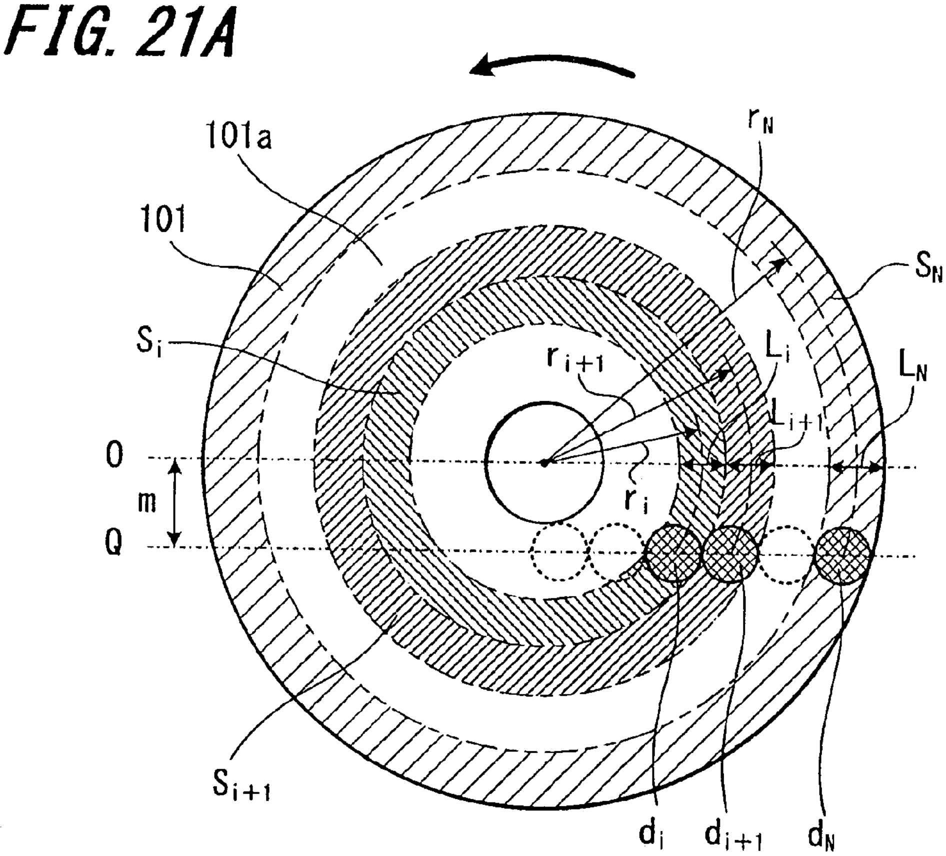
FIGS. 21A and 21B are diagrams useful in explaining dot correction weightings used by the third embodiment of a print apparatus according to the present invention, with FIG. 21A showing a print region to be printed with the dot groups of the polar coordinate data and FIG. 21B showing calculation of the width of a zone in the print region to be printed with the dot group positioned in the outermost periphery of the polar coordinate data.
Figure 22A:
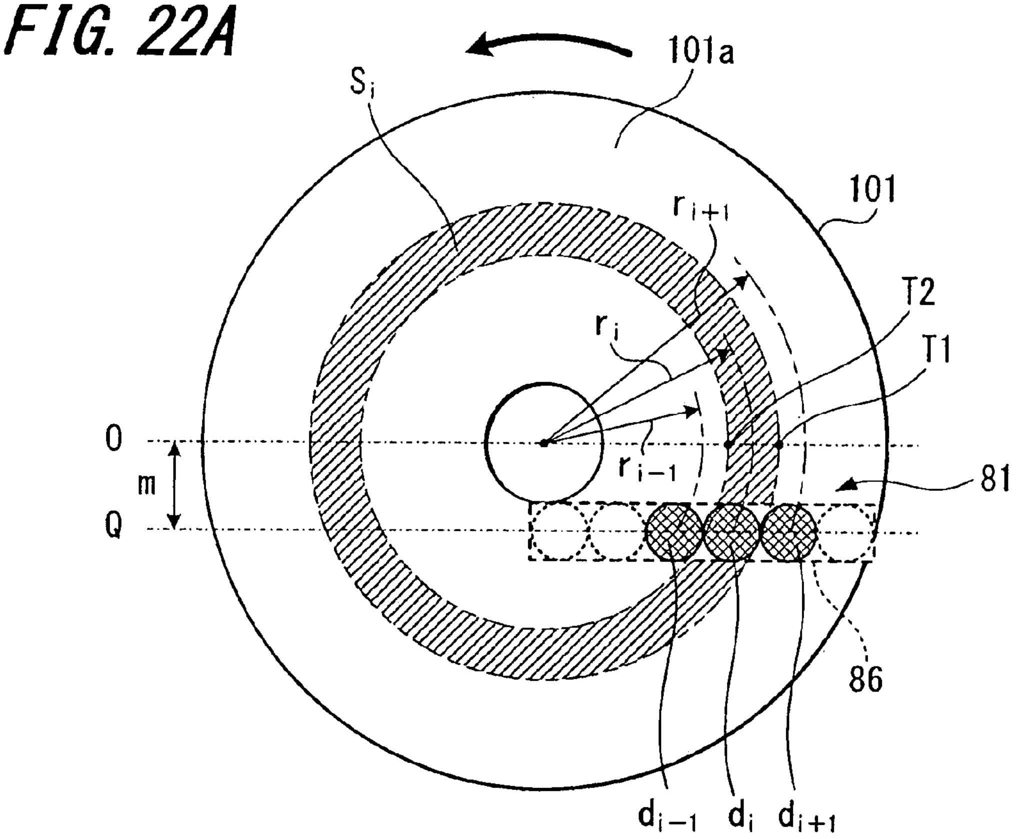
FIGS. 22A and 22B show a fourth embodiment of a print apparatus according to the present invention, with FIG. 22A showing a print region to be printed with a dot group to be weighted and FIG. 22B showing a print region to be printed with a dot group positioned in the outermost periphery.
Figure 22B:
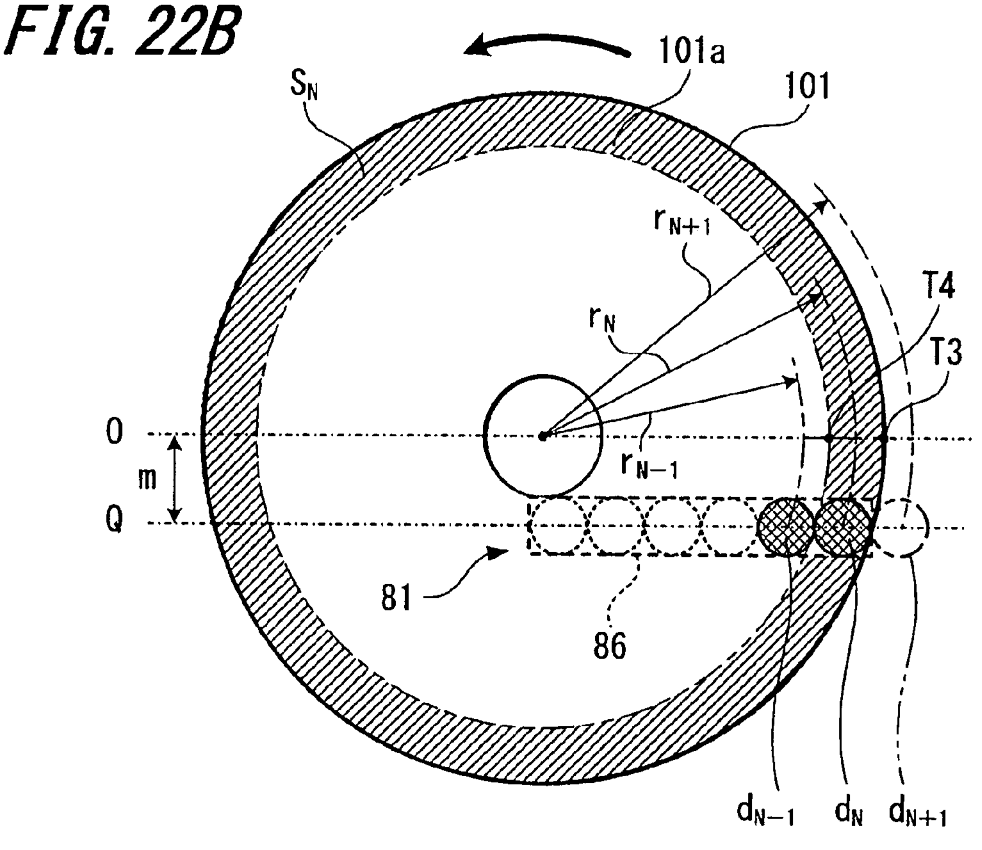

As shown in FIG. 21A, in the present embodiment, the print region to be printed with the dot $D_N$ group is thought to be an approximately ring-shaped zone. If the width of this zone (i.e., the length in a direction parallel to the radial direction of the optical disc 101) is expressed as $L_N$ and the radius of the dots $d_N$ is expressed as $r_N$, the area $S_N$ of the print region to be printed with the dot $D_N$ group is given by $$\begin{aligned} S_N &= \pi(r_N + L_N/2)^2 - \pi(r_N - L_N/2)^2 \\ &= \pi((r_N + L_N/2)^2 - (r_N - L_N/2)^2) \\ &= \pi((r_N + L_N/2) + (r_N - L_N/2))((r_N + L_N/2) - (r_N - L_N/2)) \\ &= \pi(2r_N)(L_N) \\ &= 2\pi r_N L_N. \end{aligned}$$

From this, the number of dots $D_N$ per unit area of the dot $D_N$ group is given by $$D_N=n/2\pi r_N L_N.$$

Similarly, if the number of dots in the dot $d_i$ group to be weighted is expressed as n (which is equal to the number of dots in the dot $d_N$ group) and the area of the print region to be printed with the dot $d_i$ group to be weighted is expressed as $S_i$, the number of dots $D_i$ per unit area of the dot $d_i$ group is calculated by the following equation.

$$D_i=n/S_i$$

As shown in FIG. 21A, in the present embodiment, the print region to be printed with the dot $d_i$ group is thought to be an approximately ring-shaped zone. If the width of this zone (i.e., the length in the direction parallel to the radial direction of the optical disc 101) is expressed as $L_i$ and the radius of the dots $d_i$ is expressed as $r_i$, the area $S_i$ of the print region to be printed with the dot $D_i$ group is given by $$\begin{aligned} S_i &= \pi(r_i + L_i/2)^2 - \pi(r_i - L_i/2)^2 \\ &= 2\pi r_i L_i. \end{aligned}$$

From this, the number of dots $D_i$ per unit area of the dot $D_i$ group is given by $$D_i=n/2\pi r_i L_i.$$

Accordingly, the correction weighting $W(d_i)$ for the dots $d_i$ is calculated according to the following equation.

$$\begin{aligned} W(d_i) &= D_N/D_i \\ &= (n/2\pi r_N L_N)/(n/2\pi r_i L_i) \\ &= r_i L_i / r_N L_N \end{aligned}$$

Figure 21B:
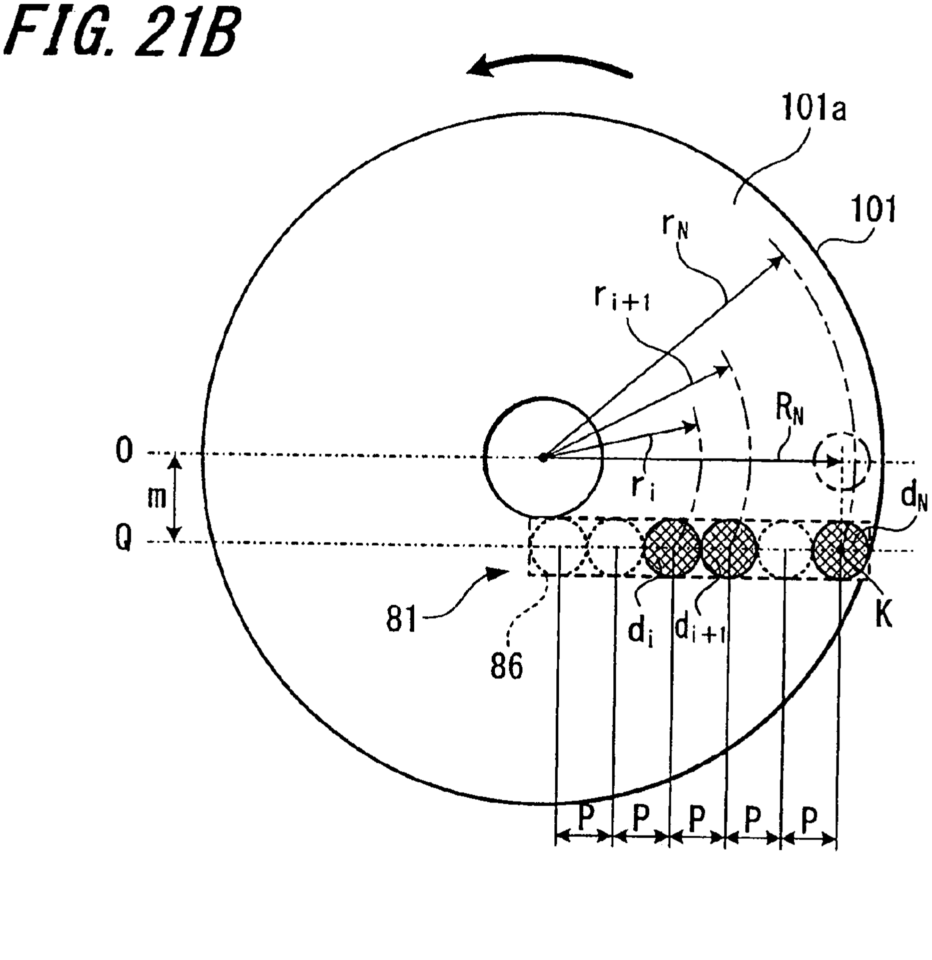

Next, the width $L_N$ of the zone in the print region to be printed with the dots $d_N$ will be described. As shown in FIG. 21B, if the radius $r_N$ of the dot $d_N$ is expressed by a value $R_N$ that is the radius of a dot $d_N$ whose center K coincides with the movement axis Q after such dot $d_N$ has been moved in a direction perpendicular to the movement axis Q so that the center K coincides with the standard axis O and the nozzle pitch of the ejection nozzles 86 is expressed as P, the width $L_N$ of the zone in the print region to be printed with the dots $d_N$ is calculated according to the following equation.

$$L_N=PR_N/r_N$$

Similarly, if the radius of the dots $d_i$ is expressed as $r_i$, the width $L_i$ of the zone in the print region to be printed with the dot $d_i$ group that is to be weighted is calculated according to the following equation.

$$L_i=2(r_{i+1}-r_i-L_{i+1}/2)$$

Next, the correction weightings $W(d_i)$ for the dots $d_i$ will be described using specific values. As examples, the nozzle pitch P is set at 1 mm, the radius of the radius $R_N$ of the dots $d_N$ is set at 59.5 mm, and the offset m from the standard axis O to the movement axis Q is set at 15 mm. Here, the radius $R_N$ produced when the dot $d_N$ is moved so that the center K coincides with the standard axis O is calculated according to the Pythagorean theorem at approximately 57.6 mm. Accordingly, the width $L_N$ of the zone in the print region to be printed with the dot $d_N$ group is given by $$\begin{aligned} L_N &= PR_N/r_N \\ &= 1 \times 57.6/59.5 \\ &= \text{approximately } 0.968 \text{ (mm)}. \end{aligned}$$

Since the nozzle pitch P is 1 mm, the radius $R_N$ of the dots $d_N$ is 59.5 mm, and the offset m from the standard axis O to the movement axis Q is 15 mm, the radii $r_{N-1}$, $r_{N-2}$, $r_{N-3}$, . . . of the dots $d_{N-1}$, $d_{N-2}$, $d_{N-3}$, . . . are determined (calculated). For example, the radius $r_{N-1}$ of the dots $d_{N-1}$ can be calculated as follows. The value $R_{N-1}$ that is the radius of a dot $d_{N-1}$ of which center coincides with the movement axis Q when such dot $d_{N-1}$ has been moved in a direction perpendicular to the movement axis Q so that the center coincides with the standard axis O is approximately 56.6 mm. Since the offset from the standard axis O to the movement axis Q is 15 mm, the radius $r_{N-1}$ of the dots $d_{N-1}$ is calculated according to the Pythagorean theorem at approximately 58.5 mm. The radii $r_{N-1}$, $r_{N-2}$, $r_{N-3}$, . . . of the dots $d_{N-1}$, $d_{N-2}$, $d_{N-3}$, . . . are shown in Table 1.

TABLE 1

| | |
|---|---|
| $r_N$ | 59.5 |
| $r_{N-1}$ | 58.5 |
| $r_{N-2}$ | 57.6 |
| $r_{N-3}$ | 56.6 |
| $r_{N-4}$ | 55.6 |
| $r_{N-5}$ | 54.7 |
| $r_{N-6}$ | 53.7 |
| $r_{N-7}$ | 52.8 |
| $r_{N-6}$ | 51.8 |
| $r_{N-9}$ | 50.8 |
| $r_{N-10}$ | 49.9 |
| $r_{N-11}$ | 48.9 |
| $r_{N-12}$ | 48.0 |
| $r_{N-13}$ | 47.0 |
| $r_{N-14}$ | 46.1 |

TABLE 1-continued

| | |
|---|---|
| $r_{N-15}$ | 45.1 |
| . | . |
| . | . |
| . | . |

Next, based on the radius $r_N$ of the dots $d_N$, the radius $r_{N-1}$ of the dots $d_{N-1}$, and the width $L_N$ of the zone in the print region to be printed with the dot $d_N$ group, the width $L_{N-1}$ of the zone in the print region to be printed with the dot $d_{N-1}$ group is calculated. The width $L_{N-1}$ of this zone can be calculated by substituting $L_{N-1}$ for $L_i$, $r_N$ for $r_{i+1}$, $r_{N-1}$ for $r_i$, and $L_N$ for $L_{i+1}$ in the equation $L_i=2\ (r_{i+1}-r_i-L_{i+1}/2)$ to produce the equation $L_{N-1}=2\ (r_N-r_{N-1}-L_N/2)$.

Since $r_N=59.5$ (mm)

$r_{N-1}=58.5$ (mm)

$L_N=$approximately 0.968 (mm)

as described earlier, the width $L_{N-1}$ of the zone is given by $$\begin{aligned} L_{N-1} &= 2(59.5 - 58.5 - 0.968/2) \\ &= \text{approximately } 0.697 \text{ (mm)} \end{aligned}$$

In the same way, the widths $L_{N-2}$, $L_{N-3}$, . . . of the zones can also be calculated. The widths $L_{N-2}$, $L_{N-3}$, . . . of the zones calculated in this way are shown in Table 2.

TABLE 2

| | |
|---|---|
| $L_N$ | 0.968 |
| $L_{N-1}$ | 0.967 |
| $L_{N-2}$ | 0.965 |
| $L_{N-3}$ | 0.964 |
| $L_{N-4}$ | 0.963 |
| $L_{N-5}$ | 0.962 |
| $L_{N-6}$ | 0.960 |
| $L_{N-7}$ | 0.959 |
| $L_{N-6}$ | 0.957 |
| $L_{N-9}$ | 0.955 |
| $L_{N-10}$ | 0.954 |
| $L_{N-11}$ | 0.952 |
| $L_{N-12}$ | 0.950 |
| $L_{N-13}$ | 0.948 |
| $L_{N-14}$ | 0.946 |
| $L_{N-15}$ | 0.943 |
| . | . |
| . | . |
| . | . |

For example, when the $d_{N-12}$ group is the dot $d_i$ group to be weighted, the radius $r_i$ of the dots $d_i$ is approximately 48.0 mm ($r_{N-12}$) as shown in Table 1 and the width $L_i$ of the zone in the print region to be printed with the dot $d_i$ group is approximately 0.950 mm ($L_{N-12}$) as shown in Table 2. Accordingly, the correction weighting $W(d_i)$ for the dots $d_i$ is given by $$\begin{aligned} W(d_i) &= r_i L_i / r_N L_N \\ &= 48.0 \times 0.950/59.5 \times 0.968 \\ &= \text{approximately } 0.792 \end{aligned}$$

By applying the correction weighting $W(d_i)=r_iL_i/r_NL_N$ described above to the respective dots $d_i$ in the polar coordinate data, the print control unit 53 of the optical disc apparatus 60 can calculate the dot correction data. After this, in the same way as in the first embodiment, the print control unit 53 binarizes the dot correction data according to an error diffusion method to generate the ink ejection data (step S4). Next, the ink ejection data is divided into pieces of a size corresponding to the number of ejection nozzles 86 provided on the print head 81 and the order for ejecting the ink droplets is set (step S5). By printing the ink ejection data calculated in this way, it is possible to reduce the ejecting of excess ink droplets in the radial direction and the circumferential direction as the distance from the inner periphery of the optical disc falls and therefore possible to make the print density substantially uniform in the inner and outer peripheries of the label surface 101*a*.

FIG. 22A and FIG. 22B are explanatory diagrams of an optical disc apparatus that is a fourth embodiment of a print apparatus according to the present invention. The optical disc apparatus according to the fourth embodiment of the present invention has substantially the same construction as the optical disc apparatus 60 according to the third embodiment and differs only in the correction weightings. Accordingly, description of the construction that is the same as the optical disc apparatus 60 according to the third embodiment is omitted and the correction weightings will be described in detail.

In the same way as the optical disc apparatus 60 according to the third embodiment, the optical disc apparatus according to the fourth embodiment applies the same correction weighting to dots at the same radius. That is, the correction weightings used by the optical disc apparatus according to the fourth embodiment are each calculated based on the ratio of the number of dots per unit area of a dot group at the same radius that is to be weighted to the number of dots per unit area of the dot group positioned in the outermost periphery of the polar coordinate data. Accordingly, if the number of dots per unit area of the dot $d_i$ group to be weighted is expressed as $D_i$ and the number of dots per unit area of the dot $d_N$ group positioned in the outermost periphery of the polar coordinate data is expressed as $D_N$, the weighting $W(d_i)$ for the dots $d_i$ is calculated by the following equation.

$$W(d_i)=D_i/D_N$$

In the present embodiment, the number of dots $D_N$ per unit area of the dot $d_N$ group and the number of dots $D_i$ per unit area of the dot $d_i$ group are approximately calculated and the correction weighting $W(d_i)$ is calculated based on the results of such calculations. First, the number of dots $D_i$ per unit area of the dot $d_i$ group will be described. If the number of dots in the dot $d_i$ group to be weighted is expressed as n and the area of the print region to be printed with the dot $d_i$ group to be weighted is expressed as $S_i$, the number of dots $D_i$ per unit area is calculated by the following equation.

$$D_i=n/S_i$$

As shown in FIG. 22A, in the present embodiment, the print region to be printed with the dot $d_i$ group is thought to be an approximately ring-shaped zone. The width of this zone (i.e., the length in a direction parallel to the radial direction of the optical disc 101) is expressed by the distance from a center point T1 between the radius $r_i$ of the dot $d_i$ and the radius $r_{i+1}$ of the dot $d_{i+1}$ to a center point T2 between the radius $r_i$ of the dot $d_i$ and the radius $r_{i-1}$ of the dot $d_{i-1}$. Accordingly, the area $S_i$ of the print region to be printed with the dot $d_i$ group to be weighted is given by $$\begin{aligned} S_i &= \pi((r_i + r_{i+1})/2)^2 - \pi((r_{i-1} + r_i)/2)^2 \\ &= \pi(((r_i + r_{i+1})/2)^2 - ((r_{i-1} + r_i)/2)^2) \\ &= \pi((r_i + r_{i+1})/2 + (r_{i-1} + r_i)/2)((r_i + r_{i+1})/2 - (r_{i-1} + r_i)/2) \\ &= \pi(2r_i + r_{i+1} + r_{i-1})(r_{i+1} - r_{i-1})/2. \end{aligned}$$

Accordingly, the number of dots $D_i$ per unit area of the dot $d_i$ group is $$D_i = 2n/\pi(2r_i + r_{i+1} + r_{i-1})(r_{i+1} - r_{i-1}).$$

Similarly, if the number of dots in the dot $d_N$ group positioned in the outermost periphery of the polar coordinate data is expressed as n and the area of the print region to be printed with the dot $d_N$ group positioned in the outermost periphery of the polar coordinate data is expressed as $S_N$, the number of dots $D_N$ per unit area of the dot $d_N$ group is calculated by the following equation.

$$D_N = n/S_N$$

As shown in FIG. 22B, in the present embodiment, in the same way as the print region to be printed with the dot $d_i$ group, the print region to be printed with the dot $d_N$ group is thought to be an approximately ring-shaped zone. The width of this zone (i.e., the length in a direction parallel to the radial direction of the optical disc 101) is expressed by the distance from a center point T3 between the radius $r_N$ of the dot $d_N$ and the radius $r_{N+1}$ of the dot $d_{N+1}$ to a center point T4 between the radius $r_N$ of the dot $d_N$ and the radius $r_{N-1}$ of the dot $d_{N-1}$. Accordingly, the area $S_N$ of the print region to be printed with the dot $d_N$ group is given by $$\begin{aligned} S_N &= \pi((r_N + r_{N+1})/2)^2 - \pi((r_{N-1} + r_N)/2)^2 \\ &= \pi(((r_N + r_{N+1})/2)^2 - ((r_{N-1} + r_N)/2)^2) \\ &= \pi((r_N + r_{N+1})/2 + (r_{N-1} + r_N)/2)((r_N + r_{N+1})/2 - (r_{N-1} + r_N)/2) \\ &= \pi(2r_i + r_{N+1} + r_{N-1})(r_{N+1} - r_{N-1})/2. \end{aligned}$$

Accordingly, the number of dots $D_N$ per unit area of the dot $d_N$ group is given by $$D_N = 2n/\pi(2r_N + r_{N+1} + r_{N-1})(r_{N+1} - r_{N-1}).$$

As a result, the correction weighting $W(d_i)$ for the dots $d_i$ is calculated according to the following equation.

$$\begin{aligned} W(d_i) &= D_N / D_i \\ &= \frac{(2n/\pi(2r_N + r_{N+1} + r_{N-1})(r_{N+1} - r_{N-1}))}{(2n/\pi(2r_i + r_{i+1} + r_{i-1})(r_{i+1} - r_{i-1}))} \\ &= \frac{(2r_N + r_{N+1} + r_{N-1})(r_{N+1} - r_{N-1})}{(2r_i + r_{i+1} + r_{i-1})(r_{i+1} - r_{i-1})} \end{aligned}$$

Here, the radius $r_{N+1}$ of the virtual dots $d_{N+1}$ will be described. The radius $r_{N+1}$ of the virtual dots $d_{N+1}$ can be calculated as follows. In the same way as in the third embodiment, if the radius $r_N$ of the dots $d_N$ is 59.5 mm, the radius $R_{N+1}$ of the dot $d_{N+1}$ whose center coincides with the movement axis Q when such dot $d_{N+1}$ has been moved in a direction perpendicular to the movement axis Q so that the center coincides with the standard axis O is approximately 58.6 mm. If the offset from the standard axis O to the movement axis Q is 15 mm, the radius $r_{N+1}$ of the dots $d_{N+1}$ is calculated according to the Pythagorean theorem at approximately 60.5 mm.

For example, when the $d_{N-12}$ group is the dot $d_i$ group to be weighted, as shown in Table 1 and Table 2 described above, the radius $r_i$ of the dots $d_i$ is approximately 48.0 mm ($r_{N-12}$). Also, the radius $r_{i+1}$ of the dots $d_{i+1}$ is approximately 48.9 mm ($r_{N-11}$) and the radius $r_{i-1}$ of the dots $d_{i-1}$ is approximately 47.0 mm ($r_{N-13}$).

That is, $r_i$=approximately 48.0 (mm)

$r_{i+1}$=approximately 48.9 (mm)

$r_{i-1}$=approximately 47.0 (mm)

$r_N$=approximately 59.5 (mm)

$r_{N+1}$=approximately 60.5 (mm)

$r_{N-1}$=approximately 58.5 (mm).

Accordingly, the correction weighting $W(d_i)$ for the dots $d_i$, is given by $$\begin{aligned} W(d_i) &= \frac{(2 \times 48.0 + 48.9 + 47.0)(48.9 - 47.0)}{(2 \times 59.5 + 60.5 + 58.5)(60.5 - 58.5)} \\ &= \text{approximately } 0.766. \end{aligned}$$

Note that when the dot $d_i$ group to be weighted is the dot $d_i$ group positioned in the innermost periphery of the polar coordinate data, the radius $r_o$ of a virtual $d_o$ group that corresponds to the dot $d_{i-1}$ group positioned one line inside such dots $d_i$ is calculated. As one example, the radius $r_o$ of the dots $d_o$ can be calculated according to the Pythagorean theorem in the same way as the virtual dots $d_{N+1}$.

By applying the correction weighting $W(d_i)$ described above to the dots $d_i$ of the polar coordinate data, the print control unit 53 of the optical disc apparatus according to the fourth embodiment generates the dot correction data. After this, in the same way as in the first embodiment, the print control unit 53 binarizes the dot correction data using an error diffusion method to generate the ink ejection data (step S4). Next, by printing the ink ejection data generated in this way, it is possible to reduce the ejecting of excess ink droplets in the radial direction and the circumferential direction as the distance from the inner periphery of the label surface 101*a* falls and therefore possible to make the print density substantially uniform in the inner and outer peripheries of the label surface 101*a*.

As described above, according to the print apparatus of the present invention, visible information expressed using biaxial perpendicular coordinate data is converted to polar coordinate data and dot density correction is carried out to apply a correction weighting, which is calculated in accordance with the number of dots per unit area centered on each dot in the polar coordinate data, to the luminance value of each dot. After this, the dot correction data calculated by the dot density correction is binarized according to an error diffusion method to generate the ink ejection data. After this, by printing the generated ink ejection data, it is possible to reduce the ejecting of excess ink droplets as the distance from the inner periphery of the print surface of the printed object falls and therefore possible to print the visible information with a substantially uniform print density.

The present invention is not limited to the embodiments described above and shown in the drawings and can be subjected to a variety of modifications without departing from the scope of the invention. For example, although an example where a DVD-RW is used as the recording medium has been described in the above embodiments, it is possible to apply the present invention to a print apparatus that uses a recording medium of another recording method that utilizes a magneto-optical disc, a magnetic disc, or the like. In addition, a print apparatus according to an embodiment of the present invention is not limited to the disc recording/reproducing apparatus described above and it is possible to apply the present invention to a disc drive apparatus, an image pickup apparatus, a personal computer, an electronic dictionary, a DVD player, a car navigation system, or another type of electronic appliance that can use this type of print apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. A print apparatus comprising:

a rotating unit to rotate a printed object;

a print head to print visible information by ejecting ink droplets onto the printed object being rotated by the rotating unit; and a control unit to generate ink ejection data based on the visible information and controls the print head based on the ink ejection data, wherein the control unit converts the visible information, which is expressed using biaxial perpendicular coordinate data, to polar coordinate data and carries out dot density correction that applies a correction weighting to a luminance value of each dot to generate the ink ejection data, the correction weighting being calculated in accordance with a number of dots per unit area for each dot in the polar coordinate data, wherein the print head prints the visible information by moving along an axis which is parallel to a radial direction of a circle traced on the printed object being rotated and which passes through a position offset from a center of rotation of the printed object, and wherein the correction weighting is calculated according to an equation $$r_i L_i / r_N L_N$$

where $r_i$ represents radius of a dot to be weighted, $r_N$ represents radius of an outermost dot in the polar coordinate data, $L_i$ represents width of a ring-shaped zone in a print region to be printed with dots at the radius $r_i$, and $L_N$ represents width of a ring-shaped zone in a print region to be printed with dots at the radius $r_N$.

2. A print apparatus according to claim 1, wherein the control unit generates the ink ejection data by binarizing dot correction data calculated by the dot density correction according to an error diffusion method.

3. A print apparatus according to claim 1, wherein the print head prints the visible information by moving in a radial direction of a circle traced by the printed object being rotated.

4. A print apparatus comprising:

a rotating unit to rotate a printed object;

a print head to print visible information by ejecting ink droplets onto the printed object being rotated by the rotating unit; and a control unit to generate ink ejection data based on the visible information and controls the print head based on the ink ejection data, wherein the control unit converts the visible information, which is expressed using biaxial perpendicular coordinate data, to polar coordinate data and carries out dot density correction that applies a correction weighting to a luminance value of each dot to generate the ink ejection data, the correction weighting being calculated in accordance with a number of dots per unit area for each dot in the polar coordinate data, wherein the print head prints the visible information by moving along an axis which is parallel to a radial direction of a circle traced on the printed object being rotated and which passes through a position offset from a center of rotation of the printed object, and wherein the correction weighting is calculated according to an equation $$(2r_N+r_{N+1}+r_{N-1})(r_{N+1}-r_{N-1})/(2r_i+r_{i+1}+r_{i-1})(r_{i+1}-r_{i-1})$$

where $r_i$ represents radius of a dot to be weighted, $r_N$ represents radius of an outermost dot in the polar coordinate data, and $r_{N+1}$ represents radius of virtual dots positioned one line outside the dots with the radius $r_N$.

5. A print apparatus according to claim 1, wherein when converting the visible information which is expressed using the biaxial perpendicular coordinate data to the polar coordinate data, the control unit thins the dots by a predetermined number of dots so that the number of dots with a radius $r_i$ under a condition of $r_N/2^n<r_i=r_N/2^{n-1}$ becomes $1/2^{n-1}$ of number of dots at a radius $r_N$ positioned in an outermost periphery of the polar coordinate data.

6. A print apparatus according to claim 5, where the correction weighting for dots at a radius $r_i$ under a condition of $r_N/2^n<r_i\leqq r_N/2^{n-1}$ is multiplied by $2^{n-1}$ times.

7. A print apparatus according to claim 4, wherein the control unit generates the ink ejection data by binarizing dot correction data calculated by the dot density correction according to an error diffusion method.

8. A print apparatus according to claim 4, wherein the print head prints the visible information by moving in a radial direction of a circle traced by the printed object being rotated.

9. A print apparatus according to claim 4, wherein when converting the visible information which is expressed using the biaxial perpendicular coordinate data to the polar coordinate data, the control unit thins the dots by a predetermined number of dots so that the number of dots with a radius $r_i$ under a condition of $r_N/2^n<r_i\leqq r_N/2^{n-1}$ becomes $1/2^{n-1}$ of number of dots at a radius $r_N$ positioned in an outermost periphery of the polar coordinate data.

10. A print apparatus according to claim 9, where the correction weighting for dots at a radius $r_i$ under a condition of $r_N/2^n<r_i\leqq r_N/2^{n-1}$ is multiplied by $2^{n-1}$ times.

* * * * *